United States Patent
Bevacqua et al.

(10) Patent No.: US 8,115,656 B2
(45) Date of Patent: Feb. 14, 2012

(54) VEHICLE SECURITY AND MONITORING SYSTEM

(75) Inventors: Kurt Bevacqua, Carlsbad, CA (US); Mark A. Osman, La Jolla, CA (US); Steven C. Dixon, Lincoln Park, NJ (US)

(73) Assignee: Recovery Systems Holdings, LLC, San Diego, CA (US)

( * ) Notice: Subject to any disclaimer, the term of this patent is extended or adjusted under 35 U.S.C. 154(b) by 245 days.

(21) Appl. No.: 12/392,942

(22) Filed: Feb. 25, 2009

(65) Prior Publication Data

US 2009/0309709 A1     Dec. 17, 2009

Related U.S. Application Data

(60) Provisional application No. 61/031,072, filed on Feb. 25, 2008.

(51) Int. Cl.
    *G08G 1/123*     (2006.01)
(52) U.S. Cl. .................. 340/989; 340/438; 340/995.1
(58) Field of Classification Search ............ 340/989, 340/801, 905, 438, 425.5, 988, 994, 426.1, 340/426.24, 426.28, 991, 995.1, 686.1, 426.18–426.19
See application file for complete search history.

(56) References Cited

U.S. PATENT DOCUMENTS

| | | | |
|---|---|---|---|
| 4,818,998 A * | 4/1989 | Apsell et al. | 342/444 |
| 5,223,844 A | 6/1993 | Mansell et al. | |
| 5,550,551 A | 8/1996 | Alesio | |
| 5,576,716 A | 11/1996 | Sadler | |
| 5,673,305 A | 9/1997 | Ross | |
| 5,682,133 A | 10/1997 | Johnson et al. | |
| 5,704,008 A | 12/1997 | Duvall, Jr. | |
| 5,796,178 A | 8/1998 | Onuma | |
| 5,898,391 A | 4/1999 | Jefferies et al. | |
| 5,917,423 A | 6/1999 | Duvall | |
| 5,986,543 A | 11/1999 | Johnson | |
| 6,028,537 A * | 2/2000 | Suman et al. | 340/988 |
| 6,067,007 A | 5/2000 | Gioia | |
| 6,229,988 B1 | 5/2001 | Stapefeld et al. | |
| 6,498,565 B2 | 12/2002 | Boulay et al. | |
| 6,507,786 B2 | 1/2003 | Flick | |
| 6,509,868 B2 | 1/2003 | Flick | |
| 6,512,465 B2 | 1/2003 | Flick | |
| 6,522,698 B1 | 2/2003 | Irving et al. | |
| 6,587,040 B2 | 7/2003 | Seto | |
| 6,606,556 B2 | 8/2003 | Curatolo et al. | |

(Continued)

FOREIGN PATENT DOCUMENTS

EP     1184829 B1     4/2007

(Continued)

*Primary Examiner* — Daniel Previl

(74) *Attorney, Agent, or Firm* — Kilpatrick Townsend & Stockton LLP

(57) ABSTRACT

A vehicle monitoring system includes a communication subsystem configured to provide two-way wireless communication, and a controller mounted in a vehicle and configured to receive data indicative of a location of the vehicle and to control the communication subsystem to transmit the data indicative of the vehicle location toward a remote communication center and receive operational information transmitted from the remote communication center. The controller receives a mode change command included in the operational information and in response changes operating mode between an authorization mode, in which the controller transmits an alert signal to the remote communication center, and a tracking mode, in which the controller transmits the data indicative of vehicle location continuously at predetermined intervals regardless of the authorization signal.

45 Claims, 12 Drawing Sheets

U.S. PATENT DOCUMENTS

| | | |
|---|---|---|
| 6,611,742 B1 | 8/2003 | Sand et al. |
| 6,665,613 B2 | 12/2003 | Duvall |
| 6,693,563 B2 | 2/2004 | Flick |
| 6,737,989 B2 | 5/2004 | Flick |
| 6,744,384 B2 | 6/2004 | Flick |
| 6,765,499 B2 | 7/2004 | Flick |
| 6,774,845 B2 * | 8/2004 | De Champlain .............. 342/374 |
| 6,798,355 B2 | 9/2004 | Flick |
| 6,803,861 B2 | 10/2004 | Flick |
| 6,831,597 B2 * | 12/2004 | Sasaki et al. ............. 342/357.46 |
| 6,847,822 B1 * | 1/2005 | Dennison et al. ......... 455/456.1 |
| 6,847,825 B1 | 1/2005 | Duvall et al. |
| 6,873,252 B2 | 3/2005 | Ono |
| 6,876,858 B1 | 4/2005 | Duvall et al. |
| 7,015,792 B2 | 3/2006 | Lessard et al. |
| 7,031,835 B2 | 4/2006 | Flick |
| 7,091,821 B2 | 8/2006 | Lessard et al. |
| 7,091,835 B2 | 8/2006 | Boulay et al. |
| 7,106,211 B2 * | 9/2006 | Duvall .......................... 340/902 |
| 7,164,986 B2 | 1/2007 | Humphries et al. |
| 7,174,243 B1 | 2/2007 | Lightner et al. |
| 2003/0222813 A1 | 12/2003 | Boulay et al. |
| 2004/0130440 A1 | 7/2004 | Boulay et al. |
| 2004/0198309 A1 | 10/2004 | Duvall |
| 2004/0233068 A1 | 11/2004 | Duvall |
| 2005/0090952 A1 | 4/2005 | Boulay et al. |
| 2005/0099275 A1 | 5/2005 | Kamdar et al. |
| 2005/0156716 A1 | 7/2005 | Flick |
| 2006/0007039 A1 | 1/2006 | Duvall |
| 2006/0261934 A1 | 11/2006 | Romano et al. |
| 2006/0261981 A1 | 11/2006 | Romano et al. |
| 2006/0276160 A1 | 12/2006 | Romano et al. |
| 2007/0066218 A1 | 3/2007 | Justice et al. |
| 2007/0066219 A1 | 3/2007 | Liu et al. |
| 2008/0036667 A1 | 2/2008 | Fedan |
| 2008/0051053 A1 | 2/2008 | Fedan |

FOREIGN PATENT DOCUMENTS

| | | |
|---|---|---|
| GB | 2419995 A | 5/2006 |
| WO | WO 2007/067914 A2 | 6/2007 |

* cited by examiner

VEHICLE SECURITY AND MONITORING SYSTEM

CROSS-REFERENCES TO RELATED APPLICATIONS

This application claims benefit of U.S. Provisional Patent Application No. 61/031,072 filed on Feb. 25, 2008 and entitled "VEHICLE SECURITY AND RECOVERY SYSTEM," which is hereby incorporated by reference in its entirety for all purposes.

BACKGROUND

This disclosure relates in general to vehicle security systems and, but not by way of limitation, to vehicle security systems for theft detection and vehicle location awareness and monitoring.

Many types of vehicle anti-theft devices having various features and combinations of features are available. One early type of vehicle anti-theft system includes a noise and light alarm that is triggered by vibration or tampering of the vehicle without a key in the lock or ignition switch of the vehicle. While this type of system is effective, perhaps, against casual thieves, it can be circumvented and does not prevent unauthorized movement of a vehicle.

Another type of anti-theft system is oriented toward theft recovery of a vehicle after it has been stolen. Equipment hidden in the vehicle transmits a signal upon a theft event and usually the signal can be received to locate the vehicle. Such systems are typically not designed to identify unexpected but authorized movement of a vehicle. Other drawbacks include limitations with respect to the accurate location of unauthorized movement. Also, the consumer who owns the vehicle must discover that the vehicle is missing and must notify law enforcement authorities before action is taken.

Finally, there exist various types of GPS (Global Positioning System) locating devices that may be used in vehicles. These products allow for tracking of fleet vehicles, for instance, in the nature of location, speed, vehicle service situations, etc. A GPS locating system can be useful, but there are limitations with respect to vehicle theft and recovery applications. Vehicle recovery systems would be useful if they provide improved theft detection and vehicle location awareness and monitoring so as to identify unauthorized movement and assist in recovery.

Accordingly, there is a need to overcome the foregoing limitations and drawbacks and provide an effective vehicle security and location system.

SUMMARY

A vehicle monitoring system includes a communication subsystem configured to provide two-way wireless communication, and a controller mounted in a vehicle and configured to receive data indicative of a location of the vehicle and to control the communication subsystem to transmit the data indicative of the vehicle location toward a remote communication center and receive operational information transmitted from the remote communication center. The controller receives a mode change command included in the operational information and in response changes operating mode between an authorization mode in which the controller transmits an alert signal to the remote communication center, the alert signal comprising the data indicative of the vehicle location and data indicating that the vehicle location change is unauthorized, in response to determining that vehicle location has changed without detecting an authorization signal within a predetermined time interval after determining that the vehicle location has changed, and a tracking mode, in which the controller transmits the data indicative of vehicle location at predetermined intervals regardless of detecting the authorization signal.

In one embodiment, a vehicle security system includes a communication subsystem configured to provide two-way wireless communication, and a controller mounted in a vehicle and configured to receive data indicative of a location of the vehicle and to control the communication subsystem to transmit the data indicative of the vehicle location toward a communication center and receive operational information transmitted from the communication center, wherein the controller receives a mode change command included in the operational information and in response changes operating mode between an authorization mode in which the controller transmits an alert signal to the remote communication center, the alert signal comprising the data indicative of the vehicle location and data indicating that the vehicle location change is unauthorized, in response to determining that vehicle location has changed without detecting an authorization signal within a predetermined time interval after determining that the vehicle location has changed, and a tracking mode, in which the controller transmits the data indicative of vehicle location continuously at predetermined intervals regardless of the authorization signal.

The capabilities of the present system include immediate notification upon the unauthorized movement of the vehicle. This notification includes the positive, specific location of the vehicle that allows for real-time action to recover the vehicle if it is determined to be an unauthorized movement. Other capabilities include low cost as compared with other tracking/recovery systems that require more specialized equipment on board a vehicle and then to also track the vehicle.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The present disclosure is directed to a system that is installed in a vehicle for identifying and reporting unauthorized movement of the vehicle concurrently with providing a positive location of the vehicle.

Figure 1:
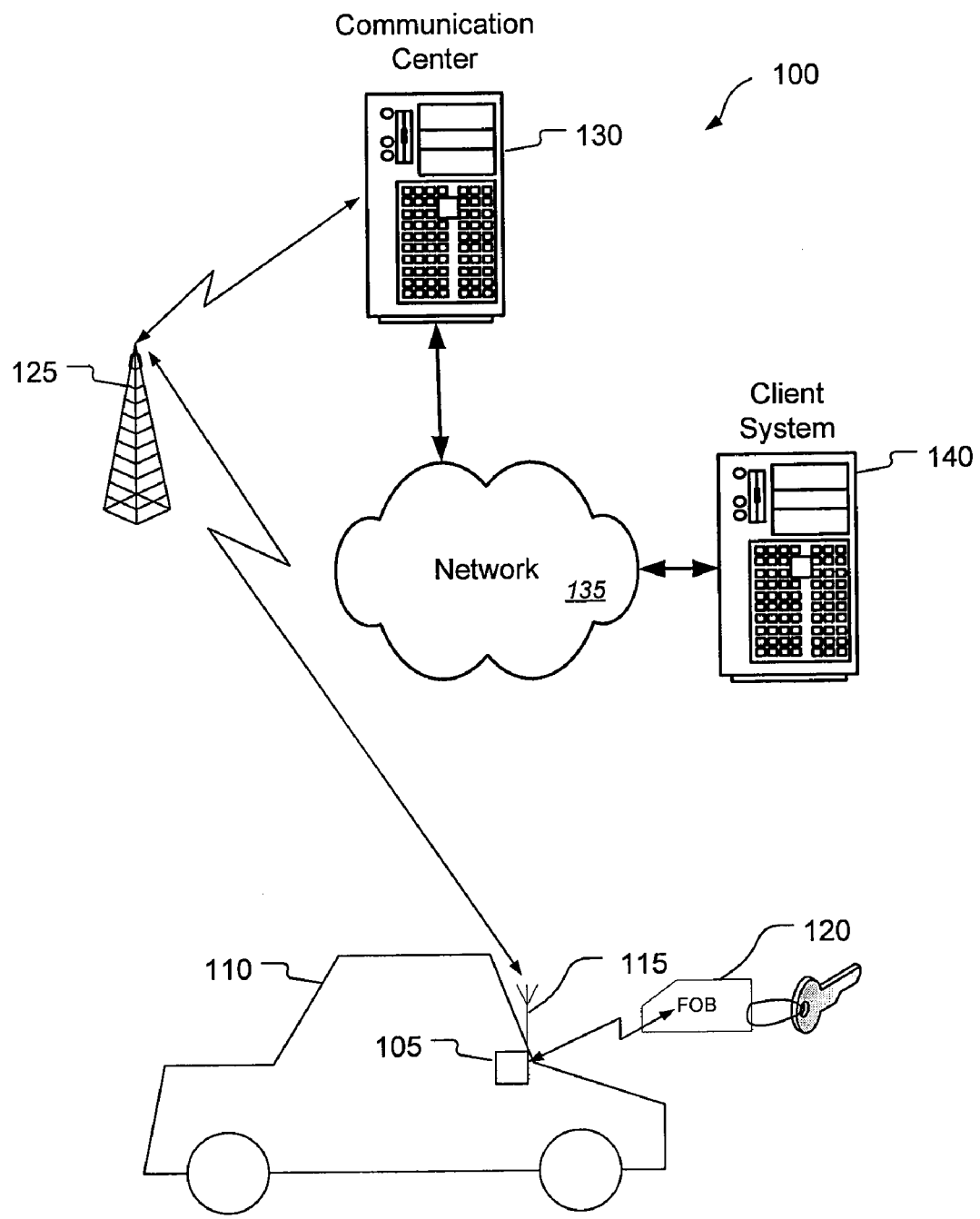
FIG. 1 is a schematic illustration of a vehicle security and monitoring system.

In one embodiment, illustrated in FIG. 1, the present disclosure describes components that provide an effective vehicle security and monitoring system. The system includes a position location subsystem (e.g., a GPS receiver, a cellular telephone based system, and the like) that is mountable within a vehicle and that provides signals at predetermined time intervals that identify the location of the vehicle. The system further includes a portable key device (e.g., a key fob, or a smart card, or a token, or a wireless telephone, or the like) including an active radio identification key also referred to as "ARIK", having a specific security serialized electronic transmitter device. An on-board processor or microcontroller mounted within the vehicle identifies movement of the vehicle, determines the presence of the portable key device, and makes a telephone call via existing GSM or other communication systems. Finally, a central communication center receives the call from the vehicle processor. Additionally, there may be a coordinated Internet Website to exchange information and make information available to law enforcement personnel and/or clients of the Website.

Referring to FIG. 1, a vehicle security and monitoring system 100 includes a monitoring system 105 mounted in a vehicle 110. The monitoring system 105 is powered by the vehicle battery, but an additional power backup source can be connected to the monitoring system 105 in the event that the car battery is not available or fails. The monitoring system is preferably mounted so that its function is not apparent, and typically the monitoring system 105 will be hidden in the vehicle 110.

The monitoring system 105 includes an antenna 115 used to communicate with a portable key device 120 and a wireless network 125. The antenna 115 is shown as an external antenna in this example, but it can be internal to the monitoring system 105 and/or the vehicle 110. The antenna 115 can be a dual mode antenna configured to communicate with the portable key device 120 and to communicate with a communication center 130 via the wireless network 125. That is, the wireless network facilitates communication between the monitoring system 105 and the communication center 130 for sending data between the two.

The portable key device 120 in this example is a key fob that has an electronic identification component. In one example, this key fob component is an RFID unit referred to as an active radio identification key or "ARIK." Therefore, the key fob is a useful identifier of an authorized user of the vehicle—whether the authorized user is a driver or a passenger—because it can be detected by the monitoring system 105. As described further below, the portable key device 120 is used as an authorization device, in that the presence of the portable key device during vehicle operation is an indication that the operation is authorized. The portable key device 120 can also be a smart card, a personal digital assistant (PDA), a wireless telephone, a token, or other wireless device. The portable key device 120 can be powered by an internal battery and/or powered by an RF signal received from the vehicle 110 or the monitoring system 105.

The wireless network 125 is illustrated having a single tower, but FIG. 1 is only an illustration and the wireless network 125 can include many base stations, mobile switching centers, backhaul wireline networks, and other infrastructure. The wireless network 125 can utilize one or more cellular standards such as Global System for Mobile Communications (GSM), code division multiple access (CDMA), time division multiple access (TDMA), WiFi (IEEE Standard 802.11x), Bluetooth or other personal area network (IEEE 802.15), WiMax (IEEE Standard 802.16), or other wireless technologies. Data can be communicated over the wireless network 125 using text messaging, short messaging service (SMS), in-band signaling (e.g., DTMF), wireless applications protocol (WAP), or other forms of data transfer known to those skilled in the art.

The communication center 130 receives information indicative of the location of the monitoring system 105 (and therefore of the vehicle 110) via the wireless network 125. In addition, the communication center 130 transmits configuration data to the monitoring system 105 via the wireless network 125. The configuration data is used to activate operating modes of the monitoring system 105. In the illustrated embodiment of FIG. 1, the operating modes include a delivery mode, a tracking mode, an authorization mode, and a custody mode. Details of these operating modes are described below in connection with FIGS. 6, 7, 8, and 9. A greater or lesser number of operating modes can be provided.

A client system 140 communicates with the communication center 130 via a communications network 135. The communications network can include one or more wired or wireless networks or combinations of the two, such as, for example, the Internet. The communication over the communications network 135 can include Internet protocols such as TCP/IP and e-mail (e.g. SMTP, POP mail, and the like). However, other forms of communication can be used over the communications network for communication between the client system 140 and the communication center 130, including, for example, voice communication (e.g., voice-over-IP (VoIP), plain old telephone services (POTS), text messaging (e.g., SMS) and other forms of communication). The client system 140 can be operated by one or more authorized users who are authorized to remotely configure and utilize the operating modes of the monitoring system 105 and otherwise gain remote access to the monitoring system from the client system. For example, the authorized user of the client system 140 might be an owner of the vehicle 110, or might be a car dealer that owns the vehicle prior to its sale or that has custody of the vehicle for servicing, or the end user might be an authorized representative of a fleet owner of the vehicle, such as a representative of a rental car company or freight delivery service.

The client system 140 can communicate with the communication center 130 over the network 135 by means of a network communication portal provided by the communication center 130. That is, the client system 140 can establish a communication session with the network 135, such as gaining access to the Internet, to view information produced by or supported by the communication center 130 on the network. The communication center can provide the information as a Website or portal of the network 135 that includes one or more user interface screens provided to the client system 140 such that the Website information can be viewed on a display of the client system. For example, the Website information can be communicated to the client system via a Web browser application.

The user interface screens provided by the communication center 130 can be used by the authorized user of the client system 140 to configure the monitoring system 105 to operate in the various operating modes, including a delivery mode, a tracking mode, an authorization mode, and a custody mode. As described further below, in the tracking mode, the monitoring system 105 automatically provides its location to the communication center 130. An authorized user at the client system 140 can view the information at the network Web portal and therefore check on the location of the vehicle. In the authorization mode, the monitoring system 105 will initiate an alert indication to the communication center 130 if the vehicle 110 is moved without the system detecting the presence of the portable key device 120. In the custody mode, the monitoring system automatically reports its location at regular intervals to a custodian comprising an authorized user. Other parameters may also be set, making the custody mode useful for performing inventory control and monitoring. In the delivery mode, the monitoring system 105 does not initiate an alert indication unless the vehicle is moved a predetermined distance from a starting location, such as a dealer lot. The delivery mode is useful for operation of the vehicle before it has been delivered to an authorized user, such as a vehicle purchaser. The delivery mode is terminated when the portable key device 120 is paired with the monitoring system 105, such that the monitoring system automatically detects the presence (or absence) of the portable key device, and identifies movement of the vehicle 110 without the identification portable key device 120 being in the vicinity of the monitoring system 105 as an unauthorized movement, whereupon the system generates an alert indication.

Figure 2:
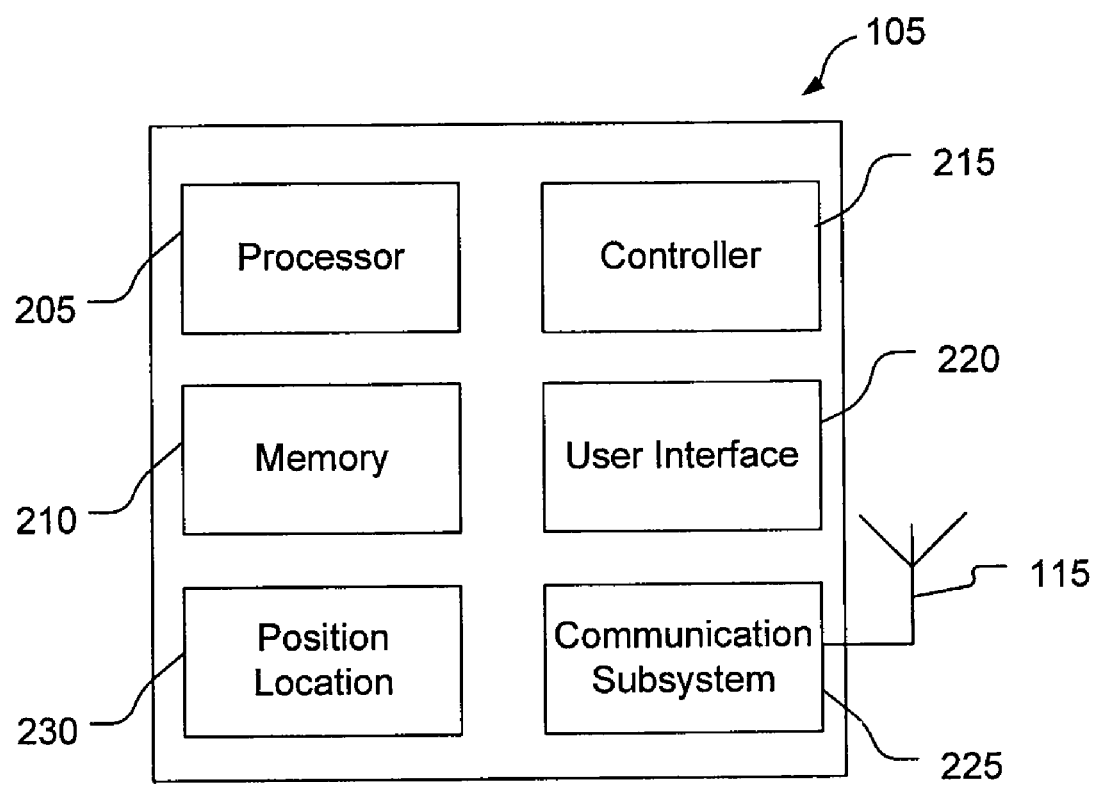
FIG. 2 shows a functional block diagram of a vehicle monitoring system used in the vehicle security and monitoring system of FIG. 1.

Referring to FIG. 2, an embodiment of a vehicle monitoring system 105 includes a processor 205, a memory 210, a controller 215, a user interface 220, a communication subsystem 225 coupled to the antenna 114 and a position location subsystem 230. The processor 205 includes one or more processors such as application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a combination thereof. The memory 210 includes one or more storage mediums. A storage medium can include one or more components in which data can be stored, including components such as read only memory (ROM), random access memory (RAM), magnetic RAM, core memory, magnetic disk storage mediums, optical storage mediums, flash memory devices, and/or other machine readable mediums for storing information.

The controller 215 is coupled to the user interface 220 to receive input commands from the user interface 220 and/or to control the user interface to output display signals (e.g., visible signals such as lights and/or audible signals such as a beep or a buzz). The user interface can include a keypad or panel switches through which a user can provide input. The user interface can include a presentation component such as one or more display devices or indicator lights or audible mechanisms such as loudspeakers. The controller 215 is also coupled to the communication subsystem 225 and configured to control the communication subsystem to transmit and receive signals via the antenna 115, the wireless network 120, and to and from the portable key device 120.

The position location subsystem 230 of the monitoring system 105 determines the geographic location of the system and thereby determines the location of the vehicle. The position location subsystem can include various satellite positioning systems (SPS), such as the United States Global Positioning System (GPS), the Russian Glonass system, the European Galileo system, or any system that uses satellites from a combination of satellite systems to determine location in terms of latitude and longitude coordinates. The position location subsystem 230 can include a cellular telephone based trilateration system for determining location. Another suitable form of position location for the system 230 is known as "SKYHOOK", developed by Skyhook Wireless, Inc., and uses a database of known WiFi MAC (medium access control) addresses and determines location based on access point MAC addresses visible to a WiFi receiver of the system.

The position location subsystem 230 can be operated to determine the location of the monitoring system 105, and hence the vehicle 110, at a predetermined time interval. For example, the position location subsystem can check its current position at intervals of one or more seconds, or at intervals of up to an hourly or daily basis. In order to be an effective identifier of current vehicle location, it is typically sufficient for the position location subsystem to check its location at intervals of about 30 seconds and up to five minutes. The location information in latitude and longitude coordinates is stored and compared to previously stored location information to determine if the vehicle coordinates have changed and therefore the vehicle has been moved. Upon the detection of movement of the vehicle, the periodic monitoring of the location of the vehicle can be modified so that the location is checked more often, for example, every several seconds or more frequently. If desired, the predetermined time interval of location determination can be adjusted according to operating mode or user input. The user input can be received from the portable key device or input can be received from the client system 140 via the communication center 130.

The communication subsystem 225 is configured to transmit a signal to the portable key device 120 and to receive an authorization signal from the portable key device in response to vehicle movement being detected. The communication subsystem 225 is also configured to communicate via the wireless network 125 utilizing one or more cellular standards such as Global System for Mobile Communications (GSM), code division multiple access (CDMA), time division multiple access (TDMA), WiFi (IEEE 802.11x), Bluetooth or other personal area network (IEEE 802.15), WiMax (IEEE 802.16), or other wireless technologies. Data can be communicated over the wireless network 125 (FIG. 1) using text messaging, short messaging service (SMS), in-band signaling (e.g., DTMF), wireless applications protocol (WAP), or other forms of data transfer.

The position location subsystem 230 can be contained in the same housing as the other subsystems and/or modules of the monitoring subsystem, as in this example, or it can be contained in a separate housing such as a vehicle mounted navigation system or cellular/satellite telephone system. Thus, the position location subsystem can be integrated with other vehicle position determining systems or can receive information from such systems.

The processor 205 of the monitoring system 105 further includes a detector component such that the processor is able to electronically detect the presence, or absence thereof, of the portable key device 120. In the case of an ARIK, the processor will include an active radio identifier or "ARI." The processor 205 is also connected to the position location subsystem 230 and records the periodic location signals received from the position location subsystem 230. The processor 205 may be contained within the same housing as the position location subsystem 230, or the processor may be remotely located from the position location subsystem. Locating the processor remotely in a separate housing generally provides improved security for the system 105. In addition to recording the location of the vehicle and storing that location, and further in addition to detecting the presence of the key fob, the processor 205 is further configured to control the communication subsystem 225 to transmit and receive information through the antenna 115 for communication over the wireless network 125 (FIG. 1).

Figure 3:
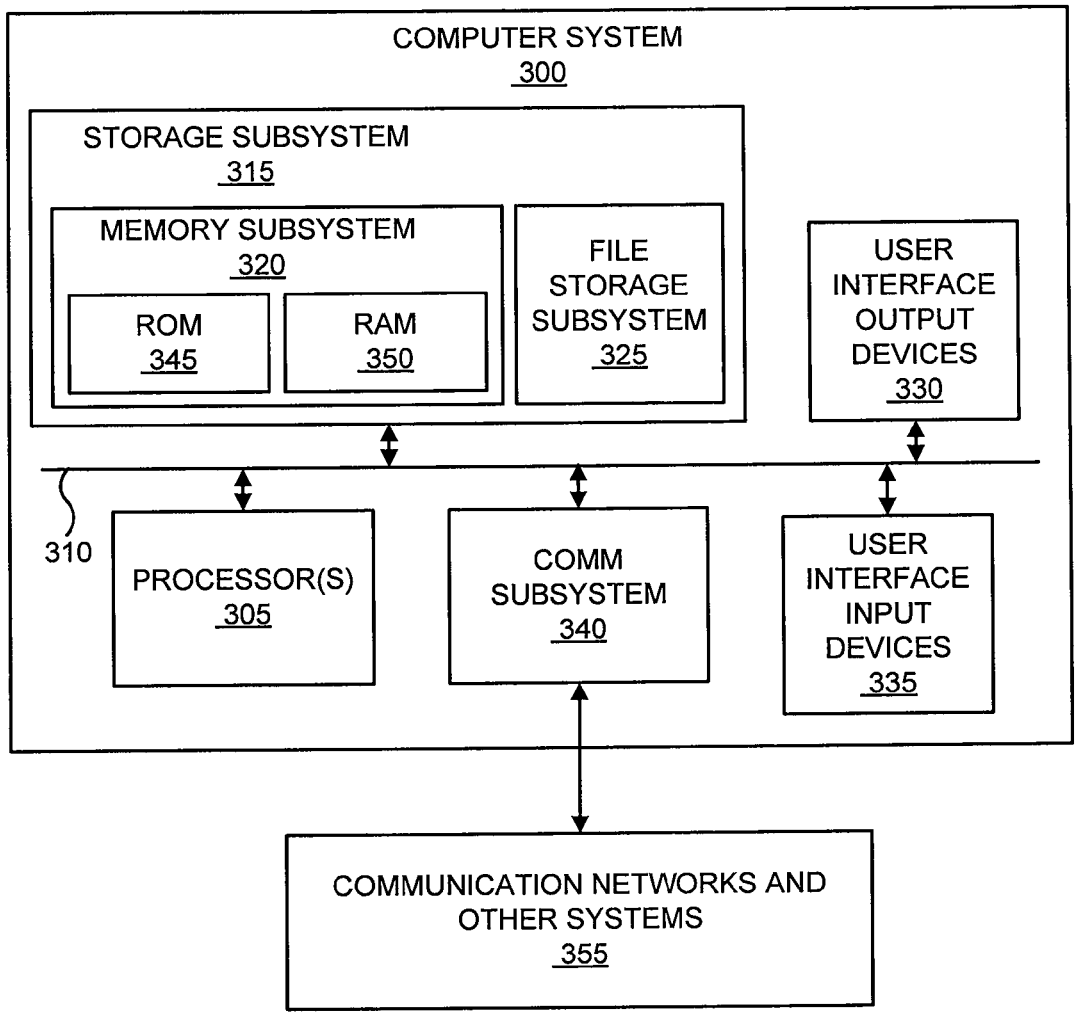
FIG. 3 is a block diagram of a computer system that may incorporate embodiments of the disclosure for performing the operations described herein, including operations of the communication center and client system of the vehicle security and monitoring system of FIG. 1.

FIG. 3 is a block diagram of a computer system 300 that may incorporate embodiments in accordance with the disclosure for performing the operations described herein, including operations of the communication center 130 and the client system 140. That is, a system having the construction illustrated in FIG. 3 is suitable for performing the operations of the communication center 130 and client system 140 illustrated in FIG. 1. Variations from the illustrated construction that are still capable of performing the described functions are also suitable and will be known to those skilled in the art. In the FIG. 3 illustrated embodiment, the computer system 300 includes one or more processors 305, a system bus 310, storage subsystem 315 that includes memory subsystem 320 and file storage subsystem 325, user interface output devices 330, user interface input devices 335, a communications subsystem 340, and the like.

In various embodiments, the computer system 300 typically includes conventional computer components such as the one or more processors 305, and memory storage devices such as a read only memory (ROM) 345 and random access memory (RAM) 350 in the memory subsystem 320, and disk drives in the file storage subsystem 325.

In the illustrated embodiment, the user interface output devices 330 can comprise a variety of devices including computer displays, viewing screens, indicator lights, loudspeakers, tactile output, and the like. The user interface input devices 335 can comprise a variety of devices including a computer mouse, a trackball, a track pad, a joystick, wireless remote, drawing tablet, voice command system, eye tracking system, a bar code reader and the like. The user interface input devices 335 typically allow a user to select objects, icons, text and the like that appear on the user interface output devices 330 via a command such as a click of a button or the like.

Embodiments of the communication subsystem 340 typically include an Ethernet card, a modem (telephone, satellite, cable, ISDN), (asynchronous) digital subscriber line (DSL) unit, FireWire interface, USB interface, and the like. For example, the communications subsystem 340 may be coupled to the communications network 135 or the wireless network 125 of FIG. 1 and other systems 355, to a FireWire bus, or the like. In other embodiments, the communications subsystem 340 can be physically integrated on the motherboard of computer system 300, may be a software program, such as soft DSL, or the like.

The RAM 350 and the file storage subsystem 325 are examples of tangible media configured to store data such as vehicle identification numbers (VIN), monitoring system identification numbers, current operating modes of monitoring systems, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like.

In the illustrated embodiment, the computer system 300 may also include software that enables communications over a network (e.g., the communications network 135 and/or the wireless network 125 of FIG. 1) such as the DNS, TCP/IP, UDP/IP, and HTTP/HTTPS protocols, and the like. In alternative embodiments of the present invention, other communications software and transfer protocols may also be used, for example IPX, or the like.

It will be readily apparent to one of ordinary skill in the art that many other hardware and software configurations are suitable for use with the present invention. For example, the computer system 300 may be a desktop, portable, rack-mounted, smart phone, PDA, or tablet configuration. Additionally, the computer system 300 may be a series of networked computers. Further, the use of other microprocessors are contemplated, such as Pentium™ and "Core 2 Duo" microprocessors from Intel Corporation; Opteron™ and AthlonXP™ microprocessors from Advanced Micro Devices, Inc; and the like. Further, other types of operating systems are contemplated, such as Windows®, WindowsXP®, Windows Vista®, or the like from Microsoft Corporation, "Solaris" from Sun Microsystems, LINUX, UNIX, and the like. In still other embodiments, the techniques described above may be implemented upon a chip or an auxiliary processing board (e.g., a programmable logic device or graphics processor unit).

Figure 4:
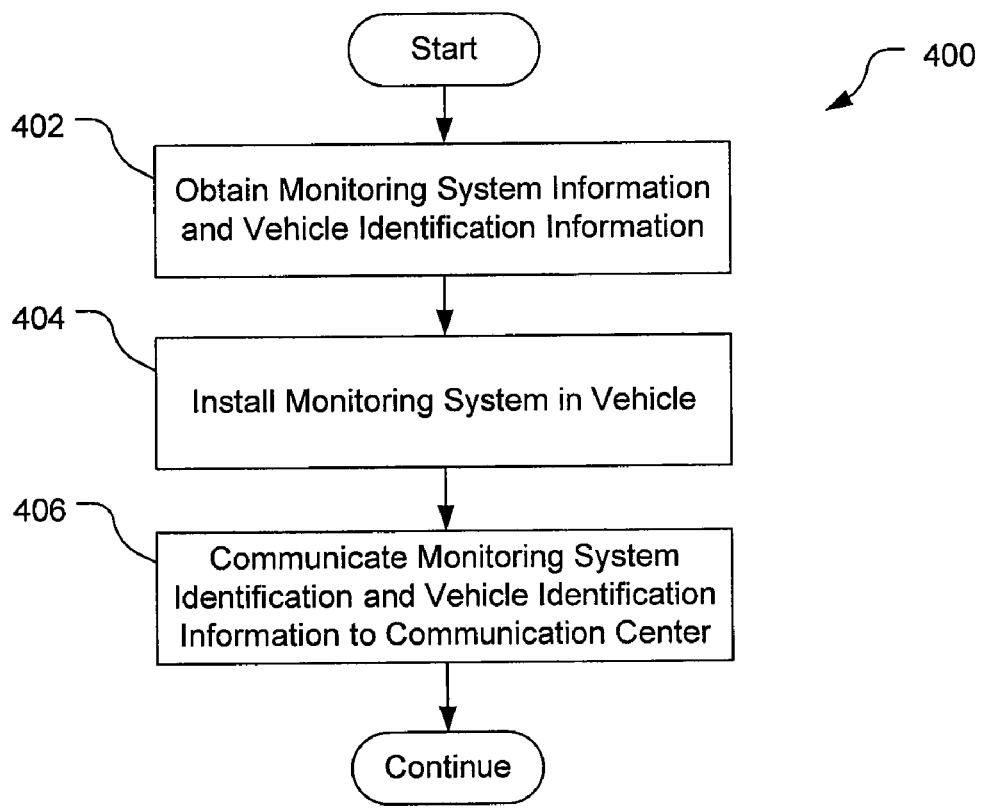
FIG. 4 shows a flowchart of an embodiment of a process for associating the FIG. 1 vehicle monitoring system with a vehicle.

Referring to FIG. 4, a process for associating the vehicle monitoring system 105 with the vehicle 110 includes the process boxes shown. The process 400 is exemplary only and not limiting. The process 400 may be modified, e.g., by adding, removing and/or rearranging the operations shown. The process 400 may be performed once the monitoring system 105 is installed in the vehicle 110. The process 400 starts at box 402, where monitoring system identification information and vehicle identification information are obtained from the monitoring system 105 and the vehicle 110, respectively. The monitoring system identification information can include a monitoring system ID number and/or a wireless network identification number such as the IMSI of a SIM card. The monitoring system identification information obtained at box 402 can be obtained by scanning (e.g., using a barcode scanner or some other reader device) one or more barcodes on the monitoring system 105 and/or communication subsystem hardware, by manually entering the data into a processing device, or by retrieving the identification electronically via wireless or wireline communications with the system hardware.

The vehicle identification information obtained at box 402 can include one or more of a VIN or a stock number used to track information related to the vehicle. The VIN number and/or the stock number can be obtained by scanning a barcode on the vehicle, or by manually entering the data into a processing device. The VIN number can be obtained from the VIN plate of the vehicle (e.g., a VIN plate visible through the windshield), or from a barcode decal located in the driver side door of most vehicles.

At box 404, the monitoring system 105 is installed in the vehicle 110. The monitoring system 105 can be installed at the point of delivery of the vehicle 110, e.g., at a car dealership, car rental agency or any other location of installation. The installation at box 404 can also take place at the point of manufacture of the vehicle. The monitoring system 105 can be located in the vehicle 110 such that it is difficult to see and/or remove the system after installation.

At box 406, the monitoring system identification information and the vehicle identification information obtained at box 402 are communicated to the communication center 130. In some embodiments, the monitoring system identification information and the vehicle identification information are also stored in the monitoring system 105. The monitoring system 105 can then communicate the information via the wireless network 125. The information obtained at box 402 can be communicated to the monitoring system 105 by the scanner or other reader device via a wireless or wired input port of the monitoring system 105. In other embodiments, the monitoring system identification information and the vehicle identification information can be communicated to the communication center 130 by the barcode scanner or reader device that obtained the information at box 402. In yet other embodiments, the monitoring system identification information and the vehicle identification information can be communicated to the communication center 130 by the client system 140 via the communication network 135.

In addition to communicating the monitoring system identification information and the vehicle identification information at box 406, other information related to the vehicle 110 and/or the custodian or owner of the vehicle 110 can also be communicated to the communication center 130. This other information may include client identification information (e.g., an identity of the custodian or the purchaser), client contact information, additional vehicle information regarding vehicle appearance and/or additional equipment installed in the vehicle, etc.

Figure 5:
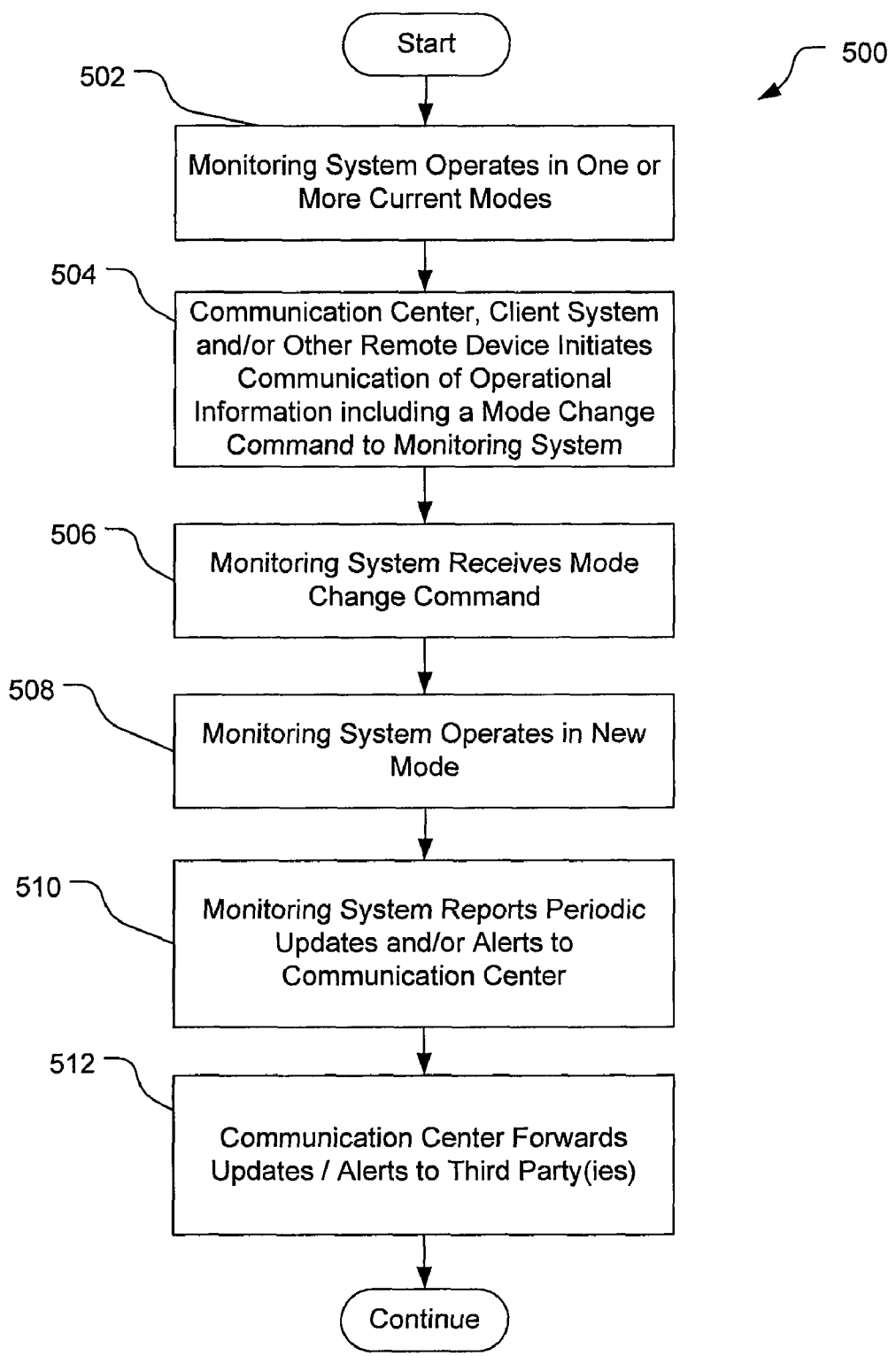
FIG. 5 shows a flowchart of an embodiment of a process for operating the vehicle security and monitoring system of FIG. 1.

Referring to FIG. 5, a process for operating the vehicle security and monitoring system 105 of FIG. 1 includes the process boxes shown. The process 500 is exemplary only and not limiting. The process 500 may be modified, e.g., by adding, removing and/or rearranging the operations shown. The process 500 starts at box 502, where the monitoring system 105 is in one or more operating modes. The operating modes include, but are not limited to, the delivery mode, the tracking mode, the authorization mode, and the custodian mode. Details of the functions performed by the monitoring system 105, the communication center 130, and the client system 140 in each of these operating modes are discussed further below in reference to FIGS. 6, 7, 8, and 9.

At box 504, the communication center 130, the client device 140, or another remote device (e.g., the portable key device 120) initiates communication of operational information including a mode change command to the monitoring system 105. The mode change command can include activation of an operating mode that is currently inactive, deactivation of a current operating mode, and/or modification of operating parameters of operating modes.

For example, if the monitoring system 105 is operating in the delivery mode, where it reports its location periodically without regard to detecting the presence of the portable key device 120, the mode change command could be a command that activates the authorization mode. For example, the authorization mode activation command can be initiated when the portable key device 120 is brought into the vicinity of the monitoring system 105 such that the monitoring system automatically detects its presence, or such that pressing a button or switch of a user interface of the portable key device transmits a signal to the monitoring system. Thus, the portable key device can initiate a mode change. Alternatively, an authorized operator at the client system 140, e.g., the vehicle owner or an automobile dealer representative or fleet owner representative, could initiate the mode activation command by using the client system 140 to transmit a mode change command to the communication center 130, which would then transmit the mode change command to the monitoring system 105 to change operating mode. Other techniques for initiating the mode change command at box 504 can be used.

At box 506, the monitoring system 105 receives the mode change command from the communication center 130, the portable key device 120, or from another remote device. The controller 215 of the monitoring system 105 controls the communication subsystem 230 to receive the mode change command via the wireless network 125 or from the portable key device 120. Upon receiving the mode change command, the process 500 continues to box 508, where the controller 215 controls the subsystems of the monitoring system 105 to operate in the new mode (or to discontinue operating in a current operating mode when the mode change command cancels a current operating mode). The monitoring system 105 can operate in more than one operating mode simultaneously. The monitoring system will resolve any operational conflicts, such as interval of determining location, to bias in favor or greater security or accuracy. For example, in the case of two modes operating simultaneously and having different position locating time intervals, the system 105 will locate its position according to the shorter time interval.

At box 510, the monitoring system 105 reports periodic updates of locations and/or alert indications for unauthorized movement, depending on its current operating mode(s). The location and/or alert updates are transmitted via the wireless network 125 to the communication center 130. Details of the information that is transmitted to the communication center and when it is reported are discussed below in reference to FIGS. 6-9.

At box 512, the communication center forwards information regarding vehicle location updates and/or alerts of unauthorized vehicle movement to authorized users of the client system(s) 140. The authorized users are authenticated by means of password, login, or other security procedures so as to be authorized to receive such location updates and alerts. For example, authorized users can include owners of the vehicle 110 who have registered with the communication center 130, custodians of the vehicle 110 (e.g., car dealers, rental car managers, fleet operators, and the like) or law enforcement authorities or other persons who have registered with the communication center or are otherwise known to be authorized.

Examples of signaling that occurs between the monitoring system 105, the communication center 130, and the client system 140 will now be discussed for the various operating modes. The flowcharts shown in FIGS. 6-9 illustrate different processes being performed simultaneously on the monitoring system 105, the communication center 130, and one or more client systems 140. The vertical arrows indicate transitions between various stages in a process being performed on one single device (e.g., the monitoring system 105). The horizontal arrows between the vertical processes of two devices indicate signaling of information between the two devices. The signaling between the monitoring system 105 and the communication center 130, for example, takes place over the wireless network 125 using text messages, SMS, in-band signaling, WAP, or other wireless communications protocols. The signaling between the communication center 130 and the client device(s) 140 takes place via the communications network 135 and can include TCP/IP, e-mail, voice (e.g., VoIP and/or POTS), or other communications methods.

Figure 6:
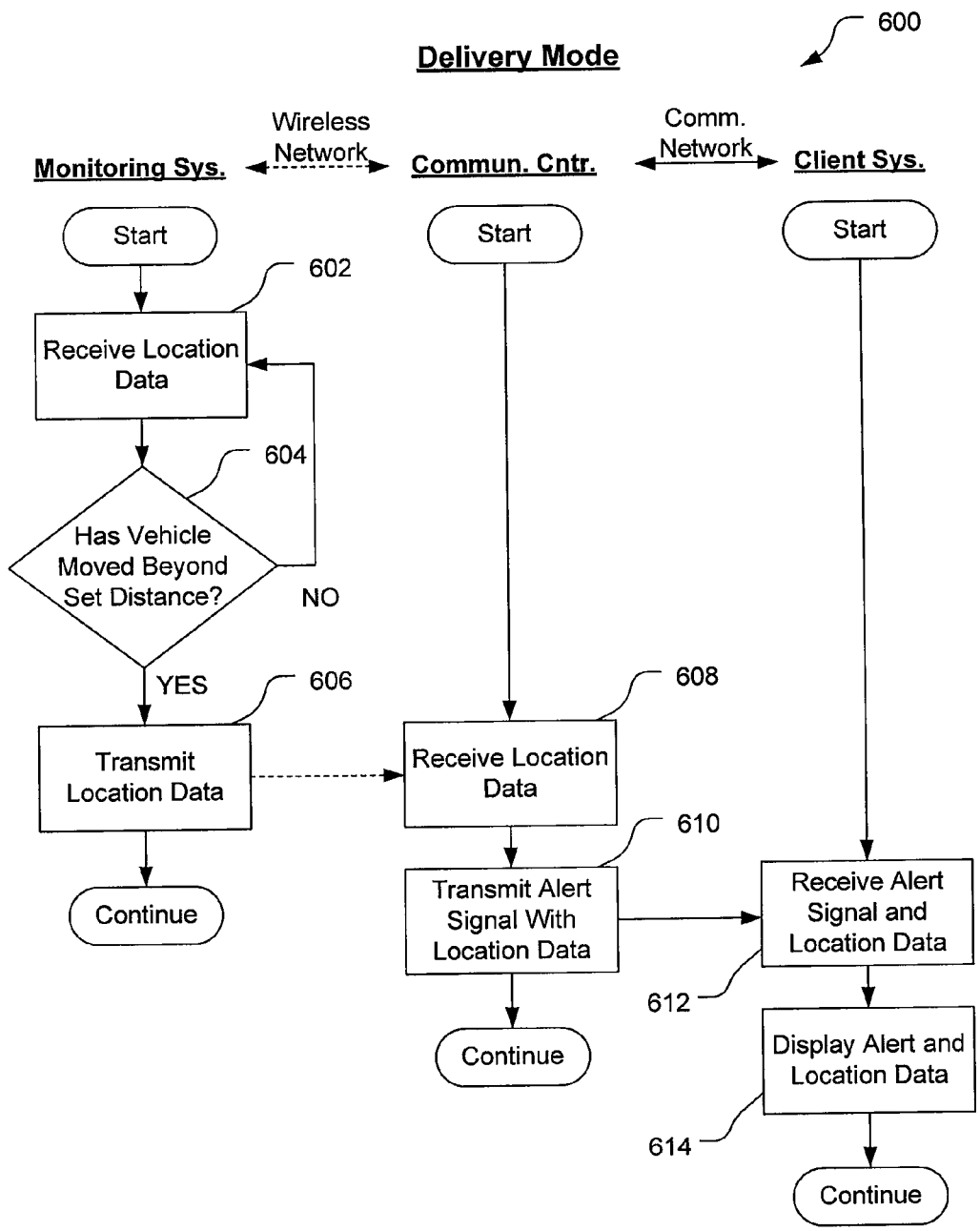
FIG. 6 shows a flowchart of an embodiment of a process for operating the vehicle security and monitoring system of FIG. 1 in a delivery mode.

Referring to FIG. 6, a process 600 for performing the delivery operating mode includes the operations shown in the flowchart. The process 600 is exemplary only and not limiting. The process 600 may be modified, e.g., by adding, removing and/or rearranging the stages shown. In one embodiment, the delivery mode is a default mode that the monitoring system 105 performs when it is first delivered or installed in a vehicle and no other operating modes have yet been activated. The process 600 starts at box 602, where the controller 215 of the monitoring system 105 receives data indicative of the location of the vehicle from the position location subsystem 230. The position location subsystem 230 can be part of a navigation system of the vehicle 110, a system based on trilateration of signals between the communication subsystem 225 and base stations of the wireless network 125, a SKYHOOK-like service using a database of known WiFi access point locations, or can comprise the position location subsystem 230 (e.g., a GPS receiver) contained in the monitoring system 105. The data received at box 602 can be raw GPS signals requiring computation by the processor 205, or can be actual latitude, longitude, and altitude coordinate parameters received from an external source such as a navigation system or network-based position location information from the wireless network 125.

Upon receiving the data indicative of the location of the vehicle 110 at box 602, the delivery operational process 600 continues at box 604, where the controller 215 determines if the vehicle 110 has moved a distance larger than a set distance threshold. The set distance threshold could be set to about two miles, for example, if the vehicle 110 is located at a car dealership and is routinely taken on short test drives. In such a situation, it is not desired to initiate an alert indication if the vehicle is driven a relatively short distance from the dealership. The distance threshold could also be set shorter or longer than two miles, depending on the embodiment and operating locale. If the controller 215 determines that the vehicle location has not moved beyond the threshold distance, a negative outcome at box 604, then the operational process 600 continues back to box 602, where the next data indicative of the location of the vehicle is received. The boxes 602 and 604 can be repeated periodically, for example, every one minute, every two minutes, every 5 minutes or other time periods according to dealer operations.

If the controller 215 determines, at box 604, that the vehicle has moved beyond the set threshold distance, an affirmative outcome at the box 604, then the delivery process 600 continues to box 606, an operation where the controller 215 controls the communications subsystem 225 to transmit the data indicative of the location to the communication center 130 via the wireless network 125. The transmission of the data to the communication center is indicated by the lateral arrow from box 606 to box 608. The location data also includes an alert identification information associated with the monitoring system 105. The location data can also include an indication of the distance that the vehicle has traveled and the rate at which the location is changing. The communication center responds to the received alert indication and location information by contacting a registered recipient, such as the dealer or fleet owner, according to contact information maintained by the communication center and typically received at the time of registration. The contact information may comprise, for example, telephone numbers, e-mail addresses, SMS numbers, and the like. Contact with the registered recipient may comprise automatic messaging or voice communications by a communication center representative.

At box 608, with further reference to the computer system 300 of FIG. 3, the processor 305 associated with the communication center 130 controls the communications subsystem 340 to receive the data indicative of the location of the vehicle from the monitoring system 105 via the wireless network 125. The data indicative of the location can be encrypted. At box 610, the processor 305 responds to the received data and controls the communications subsystem 340 to transmit a location alert signal with the data indicative of the location of the vehicle to the client system 140 via the communications network 135. The transmission of the location alert signal and data is indicated by the horizontal arrow from box 610 to box 612. In the delivery operational mode of FIG. 6, the client system is typically a system located at a car dealer or rental car representative to which the vehicle 110 has been delivered (i.e., prior to activation of the monitoring system 105).

At box 612, the client system 140 receives the alert indication signal including the location data. The alert signal also includes information identifying the vehicle 110 (such as VIN) and/or the monitoring system 105 (such as serial number of the system) with which the alert signal is associated. Upon receiving the alert signal and the location data at box 612, the process 600 continues to box 614, where the location data and/or an alert signal (e.g., a message received or a warning buzzer sounding or a warning light flashing) are displayed at the client system 140. In some embodiments, the alert display operation 614 includes showing a map with the location of the vehicle on a display of the system 140. In other embodiments, a text message or a voice message can be displayed or played at the system 140.

The monitoring system 105 can continue to transmit updated locations to the communication center 130 at box 606 on a periodic basis (regular intervals of time) and the communication center 130 can continue to transmit the alert signal and location data, at box 608, until the vehicle is returned to within the threshold distance. In one embodiment, a cancel signal from the communication center 130, or from the client system 140, is communicated to the monitoring system 105 to end the periodic transmitting of location at box 606 and cancel the alert operation.

Figure 7:
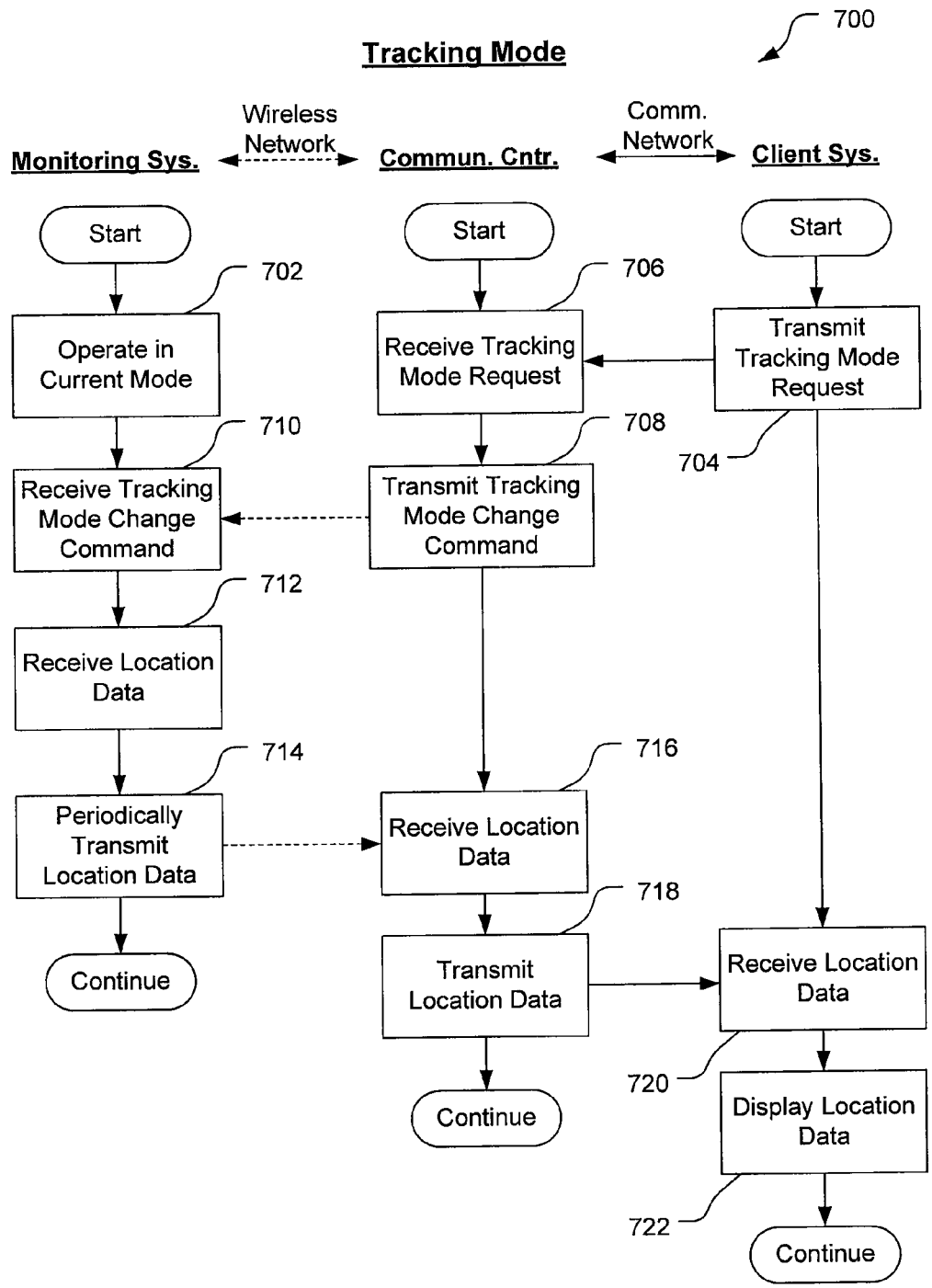
FIG. 7 shows a flowchart of an embodiment of a process for operating the vehicle security and monitoring system of FIG. 1 in a tracking mode.
Figure 8:
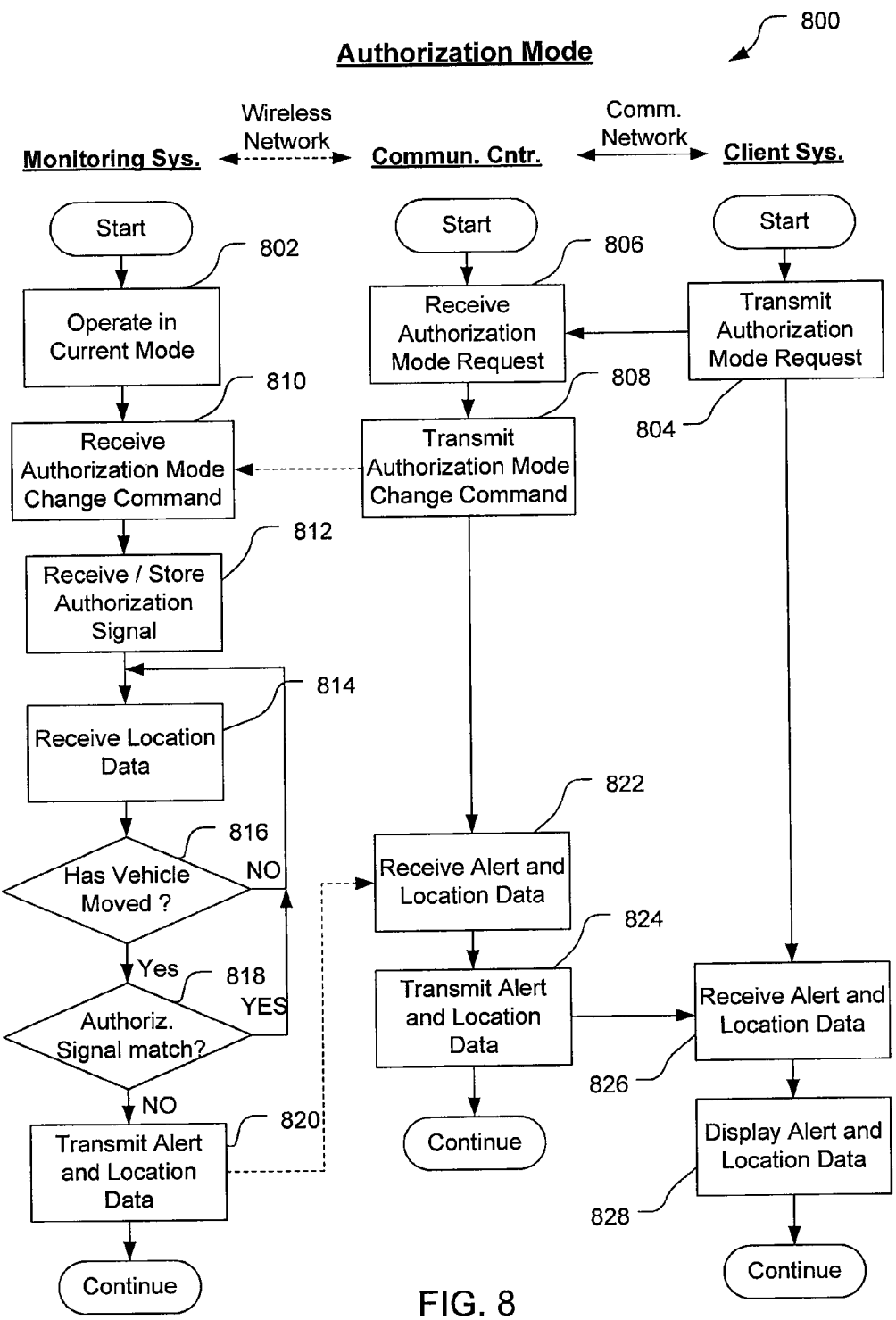
FIG. 8 shows a flowchart of an embodiment of a process for operating the vehicle security and monitoring system of FIG. 1 in an authorization mode.
Figure 9:
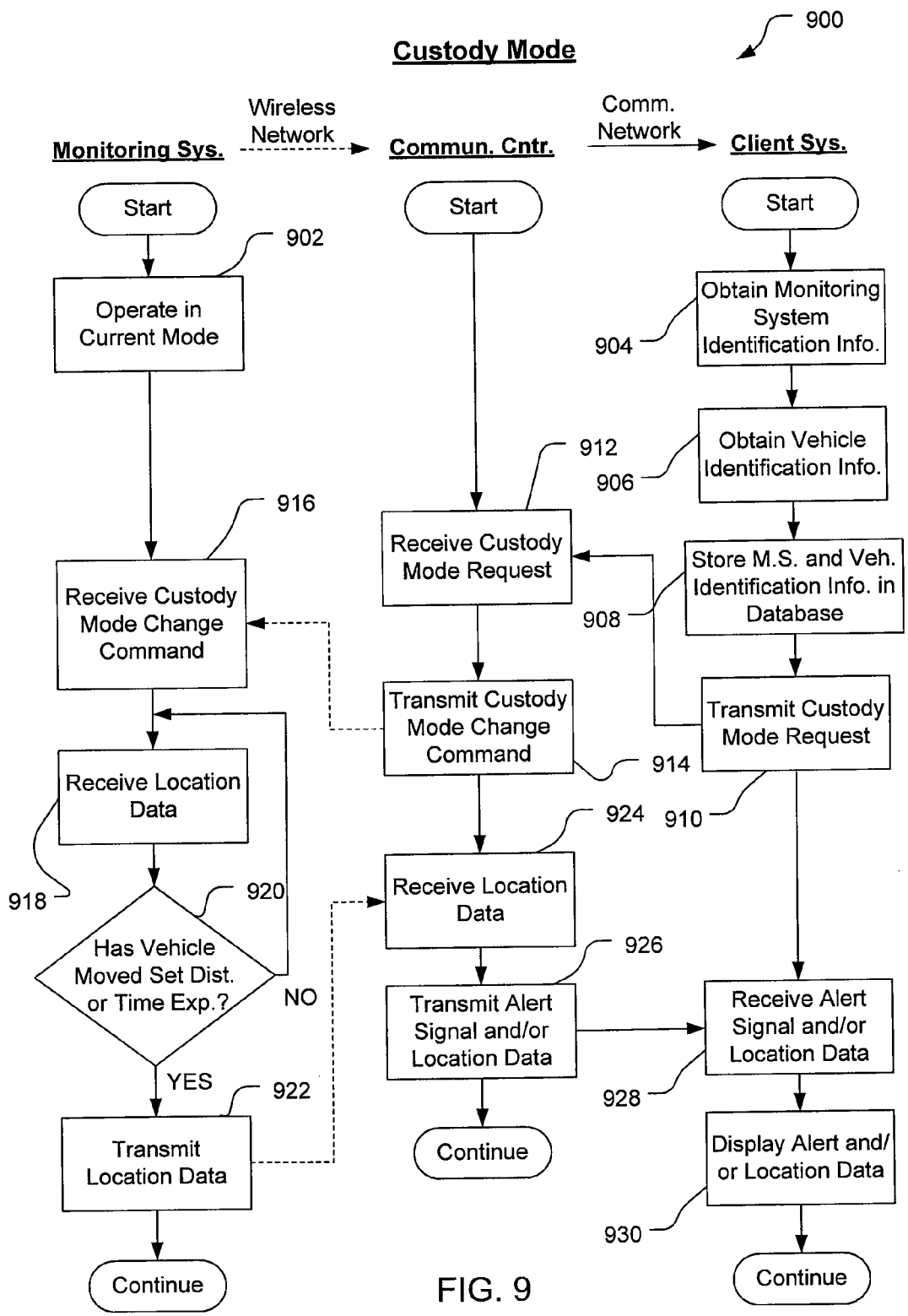
FIG. 9 shows a flowchart of an embodiment of a process for operating the vehicle security and monitoring system of FIG. 1 in a custody mode.

The rate at which the updated location is transmitted at boxes 606 and 610 can be configured by the client system 140 or by the communication center 130 by sending a mode change command signal to the monitoring system 105 (see discussion of mode change commands in reference to FIGS. 7-9). The rate of periodic updates of location at boxes 606 and 610 can depend on the speed of the vehicle 110 (as determined by the rate of change of location), or the update rate can be based on the time it takes the vehicle 110 to move a predetermined distance. That is, the faster the vehicle 110 moves, the quicker the location is updated from either or both of the monitoring system to the communication center and from the communication center to the client system. Thus, location update can be adaptive and made conditional on the rate of position change. This adaptive location update provides for more robust tracking and allows for better "last known position" information of the vehicle location in the event that the signal from the monitoring system 105 is lost (such as could occur if the vehicle 110 is moved to a parking garage or other location which blocks the position location signal).

Referring to FIG. 7, a process 700 for performing the tracking mode of operation includes the boxes shown in the flowchart. The process 700 is exemplary only and not limiting. The process 700 may be modified, e.g., by adding, removing and/or rearranging the boxes shown. The tracking mode is a mode in which the monitoring system 105 periodically transmits its location to the communication center 130, regardless of its location and/or any alert signals. The tracking mode provides a way for a custodian, an owner or other person authorized to configure the monitoring system 105 to be aware of the location of the vehicle 110.

The process 700 starts at box 702, where the monitoring system 105 is operating in one or more operating modes. The operating modes performed at box 702 can include any of the operating modes, including the delivery mode, the authorization mode, the custody mode, and/or an already-active tracking mode. The monitoring system 105 continues to perform the current operating mode(s) at box 702 until the client system 140, at box 704, transmits a tracking mode request message to the communication center 130. Transmission of the tracking mode request message from the client system to the communication system is indicated by the horizontal arrow from box 704 to box 706. The tracking mode request message includes information identifying the vehicle 110 (e.g. VIN) and/or the monitoring system 105 (e.g. serial number). In some embodiments, the authorized user operating the client system 140 performs an authentication routine (e.g., entering a user name and password) in order to be authenticated as authorized to track the vehicle 110 and/or the monitoring system 105.

Sending the tracking mode request message 704 can request canceling the operating mode currently being performed by the monitoring system 105 or can allow the current operating mode to continue to be performed concurrently with the tracking mode. In addition, the tracking mode request message can reconfigure one or more operating parameters of a current tracking mode being performed by the monitoring system 105 at box 702. For example, the tracking mode request message could increase or decrease a periodic rate at which the monitoring system 105 transmits updated location information to the communication center 130 during tracking. In this way, an authorized user, including a user other than the authorized user who initiated the tracking mode, may adjust the tracking mode operating parameters.

At box 706, the communication center 130 receives the tracking mode request message via the communications network 135. Typically, an operator of the client system 140 must be authorized before being able to send any messages to the communication center 130. Alternatively, upon receiving the message, the communication center verifies that the client system operator is authorized to do so (using one or more authorization methods). The tracking mode request message can be encrypted. In one embodiment, a form of public key infrastructure (PKI-based) encryption can be used to encrypt the tracking mode command message and verify authenticity of the sending user.

Upon the communication center 130 receiving the tracking mode request message at box 706, the process 700 continues at box 708, where the communication center transmits, via the wireless network 125, a mode change command containing information to cause the monitoring system 105 to activate the tracking mode or reconfigure tracking mode operating parameters. Transmission of the mode change command message from the communication center to the monitoring system is indicated by the horizontal arrow from box 708 to box 710. The tracking mode change command message can include other operational parameters being communicated to the monitoring system 105.

At box 710, the monitoring system 105 receives the tracking mode change command message via the wireless network 125 (using the communication subsystem 225). Upon receiving the tracking mode change command message, the monitoring system 105 periodically receives data indicative of the location of the vehicle 110 at box 712 and periodically transmits the location data to the communication center 130 at box 714 according to tracking mode operating parameters. The update interval at which the location data is transmitted at box 714 can be determined based on operating parameters received in the mode change command at box 710 (or as modified by future mode change commands), based on the rate of change of location of the vehicle 110, or based on the vehicle 110 traveling a minimum threshold distance.

At box 716, the communication center 130 receives the data indicative of the location of the vehicle 110 via the wireless network 125. This data is then transmitted by the communication center 130 to the client system 140 via the communications network 135 at box 718, as indicated by the horizontal arrow from box 718 to box 720.

At box 720, the client system 140 receives the data indicative of the location of the vehicle 110 via the communications network 135. This data is then displayed at the client system 140 at box 722. The location data displayed at box 722 can be presented as text, audio, graphical (e.g., a map), or any combination thereof.

The boxes of process 700 continue to process more tracking mode request messages sent by the client at boxes 704-710, and to continue updating the vehicle location data at boxes 712-720.

Referring to FIG. 8, a process 800 for performing the authorization mode includes the boxes shown in the flowchart. The process 800 is exemplary only and not limiting. The process 800 may be modified, e.g., by adding, removing and/or rearranging the boxes shown. The authorization mode is a mode in which the monitoring system 105 determines if the vehicle 110 moves beyond a threshold distance, and the determines if an authorization signal is received from the portable key device 120 or if the presence of the portable key device is otherwise detected. If the presence of the portable key device is not detected, the monitoring system 105 transmits an alert indication to the communication center 130 informing of the unauthorized movement of the vehicle 110.

The process 800 starts at box 802, where the monitoring system 105 is operating in one or more other operating modes. The operating modes performed at box 802 can include any of the operating modes including the delivery mode, the tracking mode, the custody mode, and/or an already-active authorization mode. The monitoring system 105 continues to perform the current operating mode(s) at box 802 until the client system 140, at box 804, transmits an authorization mode request message to the communication center 140. The authorization mode request message includes information identifying the vehicle 110 (e.g. VIN) and/or the monitoring system 105 (e.g. serial number). In some embodiments, the person operating the client system 140 performs an authentication routine (e.g., entering a user name and password) in order to prove that the end user is authorized to track the vehicle 110 and/or the monitoring system 105.

The authorization mode request message can request canceling the operating mode currently being performed by the monitoring system 105 or to allow the current mode to continue to be performed concurrently with the authorization mode. For example, if the monitoring system 105 is operating in the delivery mode, the authorization mode request message could request that the delivery mode be canceled. Alternatively, the monitoring system 105 could be configured to automatically cancel one or more current operating modes in response to receiving a mode change command activating a new mode. In addition, the authorization mode request message can reconfigure one or more operating parameters of a current authorization mode being performed by the monitoring system 105 at box 602. For example, the authorization mode request message could increase or decrease a periodic rate at which the monitoring system 105 transmits updated location information to the communication center 130.

At box 806, the communication center 130 receives the authorization mode request message via the communications network 135. The communication center 130 verifies that the end user that sent the authorization mode request message is authorized to do so (using one or more authorization methods). The authorization mode request message could be encrypted. In one embodiment, a form of public key infrastructure (PKI) based encryption can be used to encrypt the authorization mode request message and verify authenticity of the end user.

Upon the communication center 130 receiving the authorization mode request message at box 806, the process 800 continues at box 808, where the communication center 130 transmits, via the wireless network 125, a mode change command containing information to cause the monitoring system 105 to activate (or reconfigure operating parameters) the authorization mode. The authorization mode change command can be included with other operational parameters being communicated to the monitoring system 105.

At box 810, the monitoring system 105 receives the authorization mode change command via the wireless network 125 (using the communication subsystem 225). If the authorization mode change command is an initial mode change command, where the monitoring system 105 has not yet been paired with the portable key device 120, the process continues at box 812. At box 812, the monitoring system 105 and one or more portable key devices 120 are paired by the monitoring system 105 receiving and storing information indicative of an authorization signal received from the one or more portable key devices 120. Subsequent to being paired with the portable key device(s) 120, the monitoring system 105 will attempt to receive the authorization signal from the portable key device(s) and compare the received authorization signal to the stored authorization signal to verify authorized or unauthorized movement of the vehicle 110.

In one embodiment, the pairing functions of box 812 are initiated automatically by the monitoring system 105 in response to receiving the authorization mode change command at box 810. In another embodiment, not shown in FIG. 8, the monitoring system 105 receives an initialization signal from the portable device 120, and the monitoring system 105 transmits information to the communication center 130, the information identifying one or more of the vehicle 110 or the monitoring system 105 (e.g., using a monitoring system identifier and/or a wireless network identifier such as an International Mobile Subscriber Identity or IMSI stored on a subscriber identity module or SIM card). The communication center 130 then transmits an the authorization mode change command to the monitoring system 105 via the wireless network 125 at box 808.

Upon receiving the authorization mode change command message, and receiving the authorization signal at box 812 in the case of first time initialization of the authorization mode, the monitoring system 105 periodically receives data indicative of the location of the vehicle 110 at box 814. The update interval at which the location data is received at box 814 can be determined based on operating parameters received in the mode change command at box 810 (or as modified by future mode change commands), based on the rate of change of location of the vehicle 110, or based on the vehicle 110 traveling a minimum threshold distance.

Using currently received and past received location data that is stored in the memory 210 of the monitoring system 105, the controller 215 determines at box 816 if the vehicle 110 has moved. In one embodiment, the controller determines that the vehicle 110 has moved if the difference between the most recently received location and a store location is greater than a distance threshold value. The distance threshold value can be larger than an accuracy of the position location system from which the location data is received. The stored value can be an average of two or more previously received values which can improve the accuracy. The distance threshold can be in a range from about 5 feet to about 100 feet, depending on the accuracy of the location data.

If the controller 215 determines that the vehicle has not moved, a negative outcome at box 816, the process 800 returns to box 814 to receive more periodic location data updates. If, at box 816, the controller 215 determines that the vehicle 110 has moved (e.g., more than the minimum distance threshold), an affirmative outcome at box 816, the process 800 continues to box 818 where the controller 215 controls the communications subsystem 225 to check the authorization signal from the portable key device 120 and determine if the received signal matches the stored authorization signal. If, at box 818, the controller 215 determines that the received authorization matches the stored authorization signal, an affirmative outcome at box 818, the process returns to box 814.

If, at box 818, the controller 215 determines that the received authorization signal does not match the stored signal or if no authorization signal was received within a predetermined time interval after determining that the vehicle location has changed, a negative outcome at box 818, the process 800 continues to box 820, where the controller 215 controls the communication subsystem 225 to transmit an alert signal and data indicative of the location of the vehicle to the communication center 130. The alert signal can include data identifying the vehicle 110, the monitoring system 105 and/or the SIM card (e.g., the IMSI) used by the communication subsystem 225.

The monitoring system 105 continues to periodically receive data indicative of the location of the vehicle 110 at box 814 and periodically transmits updated location data to the communication center 130 at box 820. The interval at which the updated location data is transmitted at box 820 can be determined based on operating parameters received in the mode change command at box 810 (or as modified by future mode change commands), based on the rate of change of location of the vehicle 110, or based on the vehicle 110 traveling a minimum threshold distance. This periodic updating of location data can be terminated upon the monitoring system 105 receiving a mode change command that cancels the alert mode. This could be in response to an authorized person sending a cancellation request to the communication center 130. This could be in response to finding the vehicle and or reporting that the portable key device 120 is not present, but the authorized person knows that the vehicle 110 is not currently being moved in an unauthorized way.

At box 822, the communication center 130 receives the alert signal and the data indicative of the location of the vehicle 110 via the wireless network 125. This data is then transmitted by the communication center 130 to the client system 140 via the communications network 135 at box 824. The alert signal could be sent to multiple client systems or other devices associated with the client. For example, the alert signal sent at box 824 could be sent by email, cellular telephone, home telephone, business telephone, and text message (e.g., SMS).

At box 826, the client system 140 receives the data indicative of the location of the vehicle 110 via the communications network 135. This data is then displayed at the client system 140 at box 828. The location data displayed at box 622 can be textual, audio, graphical (e.g., a map) or any combination thereof.

In addition to sending the alert signal and location data to the client device 140 at box 824, the communication center 130 can send the information regarding the alert signal to a law enforcement agency via the communications network 135. The alert information sent to the law enforcement agency could include information identifying one or more of the vehicle 110, the owner, the custodian, and the current location of the vehicle 110. In one embodiment, an Internet address (e.g., a URL) and associated password information are sent to the law enforcement agency, where the Website of the communication center 130 displays the location of the vehicle 110 in real-time as updated location information is received at box 822. In this way, the law enforcement agency can accurately track the vehicle 110 and recover the stolen vehicle.

The boxes of process 800 continue to process more authorization mode request messages (e.g., cancellation of the authorization mode or updating of operating parameters) sent by the client system 140 at boxes 804-812, and to continue monitoring for unauthorized movement of the vehicle and reporting alert signals and location data at boxes 814-828.

Referring to FIG. 9, a process 900 for performing the signaling of the custody mode includes the boxes shown in the flowchart. The process 900 is exemplary only and not limiting. The process 900 may be modified, e.g., by adding, removing and/or rearranging the boxes shown. The custody mode is a mode in which the monitoring system 105 determines if the vehicle 110 moves beyond a threshold distance, and also reports periodically to a custodian of the vehicle, the location of the vehicle. The custody mode is useful when the vehicle will be in the custody of a caretaker other than the vehicle owner, or in a typical fleet situation in which many vehicles have a common owner and multiple operators. In this way a car dealer or a rental car agent can determine if a vehicle 110 is within a permitted area (e.g., within two miles of a car dealership, within the boundaries of a car dealership, within a permitted travel area, etc.) and be alerted when the vehicle goes beyond the permitted area. In addition, the location information is received periodically (e.g., nightly) regardless of the location in order to better track inventory at the custodian's business.

The process 900 starts at box 902, where the monitoring system 105 is operating in one or more other operating modes. The operating modes performed at box 702 can include any of the operating modes including the delivery mode, the tracking mode, the authorization mode, and/or a currently-active custody mode. In one embodiment, the operating system 105 is operating in the delivery mode when the vehicle 110 is first delivered to a car dealer, a car rental agency or some other custodian's place of business.

At box 904, the client system 140 of the custodian obtains monitoring system identification information from the monitoring system 105. This monitoring system identification information can include a monitoring system ID number and/or a wireless network identification number such as the IMSI of a SIM card. The identification information obtained at box 904 can be obtained by scanning one or more barcodes on the monitoring system 105 and/or communication subsystem hardware, by manually entering the data into the client system, or by retrieving the identification electronically via wireless or wireline communications with the hardware.

At box 906, the client system 140 of the custodian obtains vehicle identification information. The vehicle identification information can include one or more of a VIN or a stock number that the custodian used to track information related to the vehicle. The VIN number and/or the stock can be obtained by scanning a barcode on the vehicle, or by manually entering the data into the client system 140 of the custodian.

Upon obtaining the identification information at the boxes 904 and 906, the process 900 continues at box 908, where the client system 140 of the custodian stores the identification information associated with monitoring system 105 and the vehicle identification in a database. The information is stored such that the monitoring system identification information is linked to the vehicle identification information (e.g., a relational database).

At box 910, the client system 140 transmits a custody mode request message to the communication center 130. The custody mode request message includes information identifying the vehicle 110 and/or the monitoring system 105. In some embodiments, the person operating the client system 140 performs an authentication routine (e.g., entering a user name and password) in order to authenticate the user as one who is authorized to track the vehicle 110 and/or the monitoring system 105.

At box 912, the communication center 130 receives the custody mode request message via the communications network 135. The communication center 130 verifies that the custodian user that sent the custody mode request message is authorized to do so (using one or more authorization methods). The authorization mode request message could be encrypted. In one embodiment, a form of public key infrastructure (PKI) based encryption can be used to encrypt the authorization mode request message and verify authenticity of the end user.

Upon the communication center 130 receiving the custody mode request message at box 912, the process 900 continues at box 914, where the communication center 130 transmits, via the wireless network 125, a mode change command containing information to cause the monitoring system 105 to activate (or reconfigure operating parameters) the custody mode. The custody mode change command can be included with other operational parameters being communicated to the monitoring system 105.

The monitoring system 105 continues to perform the current operating mode(s) at box 902 until at box 916, the monitoring system 105 receives the custody mode change command via the wireless network 125 (using the communication subsystem 225). Upon receiving the custody mode change command, the monitoring system 105 periodically receives data indicative of the location of the vehicle 110 at box 918. The update interval at which the location data is received at box 918 can be determined based on operating parameters received in the mode change command at box 916 (or as modified by future mode change commands), based on the rate of change of location of the vehicle 110, or based on the vehicle 110 traveling a minimum threshold distance.

In one embodiment, upon receiving the custody mode change command at box 916, the monitoring system 105 automatically disables the authorization mode if the authorization mode was being performed at box 902. In this way, the owner of the vehicle 110 can drop off the vehicle 110 at the dealership (or a repair shop that is the custodian) and not leave the portable key device 120 and risk triggering an alert due to the authorization mode.

Using currently received and past received location data that is stored in the memory 210 of the monitoring system 105, the controller 215 determines at box 920 if the vehicle 110 has moved. In one embodiment, the controller determines that the vehicle 110 has moved if the difference between the most recently received location and a store location is greater than a distance threshold value. The distance threshold value used for the custody mode can be on the order of about one or two miles in order to allow for test drives during a repair. The distance threshold can be based on a geographic border (also known as a geo-fence) stored in the monitoring system 105.

Also at box 920, the monitoring system 105 determines if a periodic time period has elapsed. This time period can be associated with an inventory function of the custodian. The periodic time can be daily, twice daily, every other day, etc. If, at box 920, the monitoring system 105 determines that neither the vehicle has moved nor has the periodic time period passed, the process 900 continues at box 918.

If, at box 920, the monitoring system 105 determines that either the vehicle 110 has moved, or the periodic time period has passed, the process 900 continues to box 922 where the monitoring system 105 transmits data indicative of the location of the vehicle 110 to the communication center 130 via the wireless network 125. If the vehicle has moved beyond the threshold distance, the monitoring system 105 also transmits an alert signal with the data indicative of the location of the vehicle. If the location data is being transmitted due to a periodic time expiration, an alert is not sent.

At box 924, the communication center 130, receives the data indicative of the location of the vehicle 110 and/or the alert signal the via the wireless network 125. This data is then transmitted by the communication center 130 to the client system 140 via the communications network 135 at box 926. The alert signal could be sent to multiple client systems or other devices associated with the client. For example, the location data and/or alert signal sent at box 926 could be sent by email, cellular telephone, home telephone, business telephone, and text message (e.g., SMS)

At box 928, the client system 140 receives the data indicative of the location of the vehicle 110 via the communications network 135. This data is then displayed at the client system 140 at box 930. The location data displayed at box 930 can be textual, audio, graphical (e.g., a map) or any combination thereof.

In one embodiment, the client system 140 includes location information indicative of a virtual fence or "geo-fence" defining a fixed geographic permitted area. The geo-fence information can be stored in the memory of the client system 140. For example, the geo-fence can define an area around a dealership or service center or return facility. Alternatively, or additionally, the geo-fence information can be stored in a database of the communication center 130. The client system 140 can compare locations of the vehicle received from the communication center with the stored geo-fence information and determine that the end user that the vehicle has moved beyond the geo-fence defined area. The system can then generate an alarm indication signal. Alternatively, the communication center 130 can determine that the vehicle has moved into the geo-fence area.

The boxes of process 700 continue to process more custody mode request messages (e.g., cancellation of the custody mode or updating of operating parameters) sent by the client system 140 at boxes 904-916, and to continue monitoring for movement of the vehicle, expiration of periodic time periods and reporting alert signals and/or location data at boxes 918-930.

The process 700 provides an automated way for custodians to receive periodic updates on locations of large inventories of vehicles. This automated inventory of vehicles can eliminate the need for time consuming manual scanning of vehicle identification tags and updating of inventory databases each time a vehicle enters a designated space or lot.

In one embodiment, the custody mode is activated automatically in response to the monitoring system 105 arriving at a location of a certified custodian. The automatic activation of custody mode can be triggered by the monitoring system 105 comparing a current location to a database of locations of certified custodians. The database of certified custodian locations can comprise, for example, virtual fences or geo-fences as described above. Alternatively, a special beacon or waypoint could be located at the certified custodian location and the monitoring system 105 could receive an identification signal from the beacon that contains information identifying the certified custodian. Upon determining that the monitoring system 105 has entered the vicinity of a certified custodian, the monitoring system 105 transmits information identifying the identity of the certified custodian and/or the location of the certified custodian to the communication center 130 via the wireless network 125. Alternatively or additionally, the beacon or waypoint can trigger the system to report its geographic position to the communication center in response to detecting the identification signal.

Upon receiving the position information, the communication center 130 determines the identity of the certified custodian (e.g., using either the location and/or the custodian identification information received from the monitoring system 105). The communication center 130 contacts the client system 140 associated with the certified custodian and transmits data indicative of pertinent information regarding the owner and/or the vehicle that has entered the certified custodian area. The pertinent information can include owner name, car make and model, customer number, etc. In this way, the certified custodian is informed immediately that a customer has entered the area and the custodian can provide fast and efficient service to the customer.

Figure 10A:
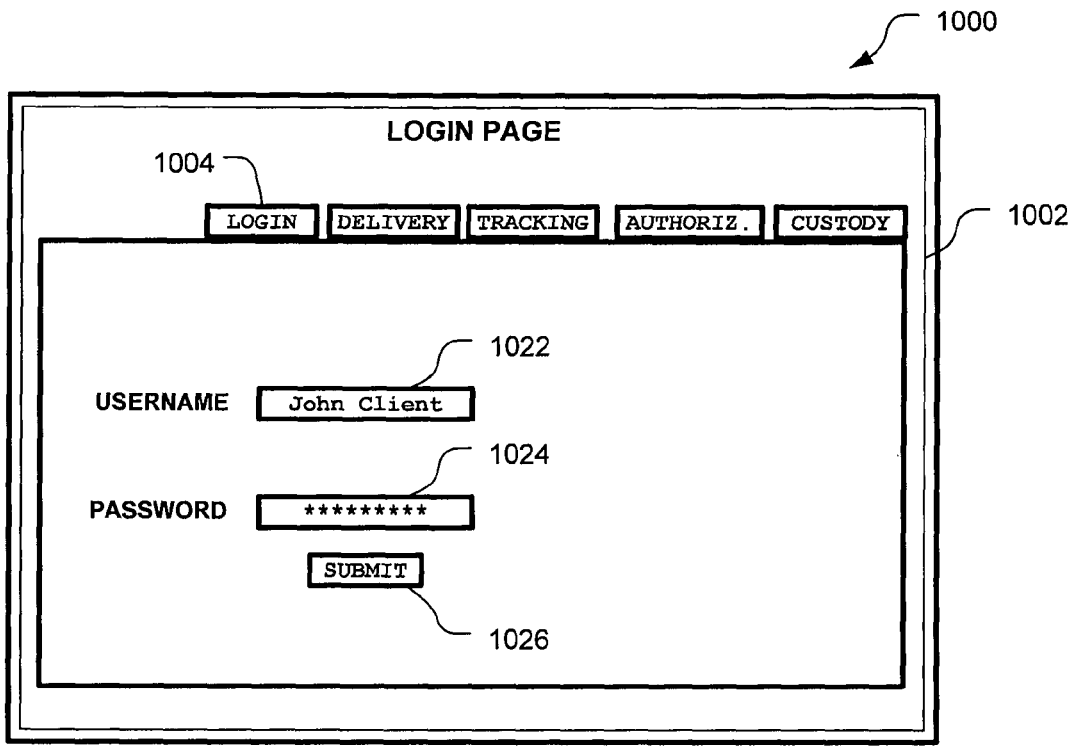
FIGS. 10A, 10B, 10C, 10D and 10E show user interface screens for managing the operational settings of a vehicle monitoring system.

FIGS. 10A, 10B, 10C, 10D and 10E show user interface screens for managing the operational settings of the vehicle monitoring system 105. The user interface screens are examples of screens that can be communicated from the communication center 130 to the client system 140 via the communications network 135. Referring to FIG. 10A, a display 1000 displays a login user interface screen 1002. The login screen 1002 can be a first screen that an end user of the client system 140 sees when trying to access the website of the communication center 130.

Figure 10B:
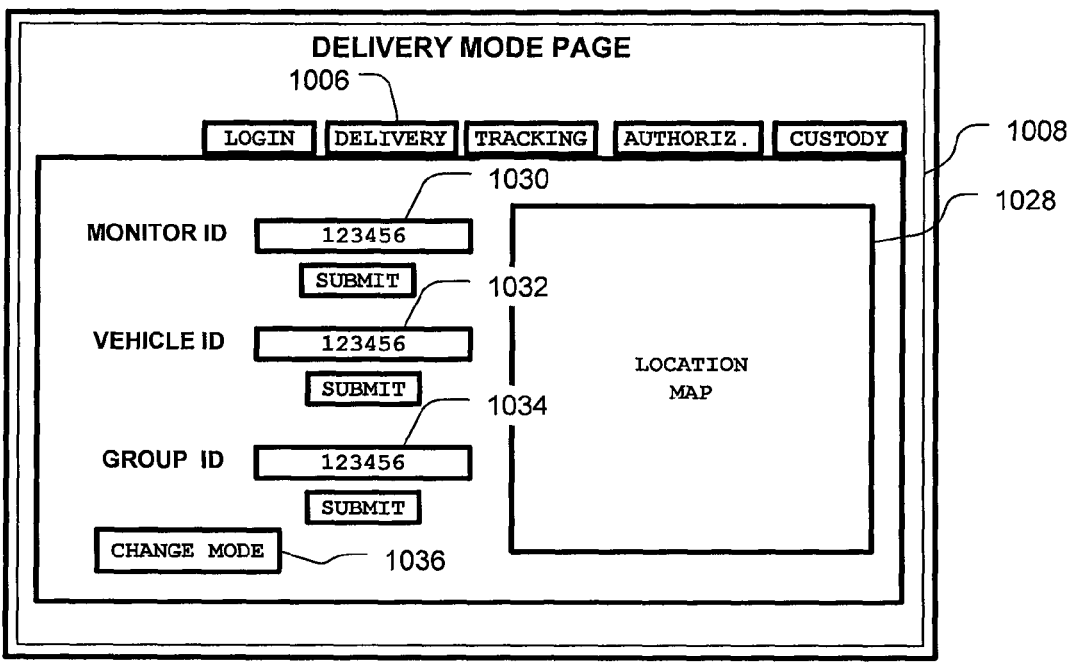

The login screen 1002 includes a login tab 1004 that allows navigation to the login screen 1002 from other screens such as a delivery mode screen 1008 illustrated in FIG. 10B. The login screen 1002 displays a text entry box 1022 for the end user to enter a username and a text entry box 1024 for the end user to enter a password. The end user selects a submit key 1026 to communicate the username and password information to the communication center 130.

Referring to FIG. 10B, the display 1000 is shown with the delivery mode screen 1008. The delivery mode screen 1008 could be a default display window that is displayed the first time the end user logs in to the website. Alternatively, the delivery mode screen 1008 could be selected with a delivery mode tab 1006. The delivery mode screen 1008 can display a location map 1028 showing the latest location of vehicles associated with the end user (e.g., those vehicles that the end user is authorized to monitor). The location map 1028 could display the time and date that the location information was obtained from the monitoring system(s).

Text entry boxes 1030, 1032 and 1034 allow the end user to specify which vehicle(s) or monitoring system(s) are being displayed on the location map 1028. Text entry box 1030 accepts monitoring system identification numbers. Text entry box 1032 accepts vehicle identification numbers (e.g., VIN, stock numbers, etc.). Text entry box 1034 accepts a group identification number that is associated with a predetermined set of monitoring systems or vehicles. The groups can be input by the end user.

A change mode button 1036 allows the end user to change the mode of the monitoring system(s). Selecting the change mode button could bring up a menu of options such as, change settings of current mode, cancel current mode, activate new mode (e.g., tracking, authorization or custody), etc.

Figure 10C:
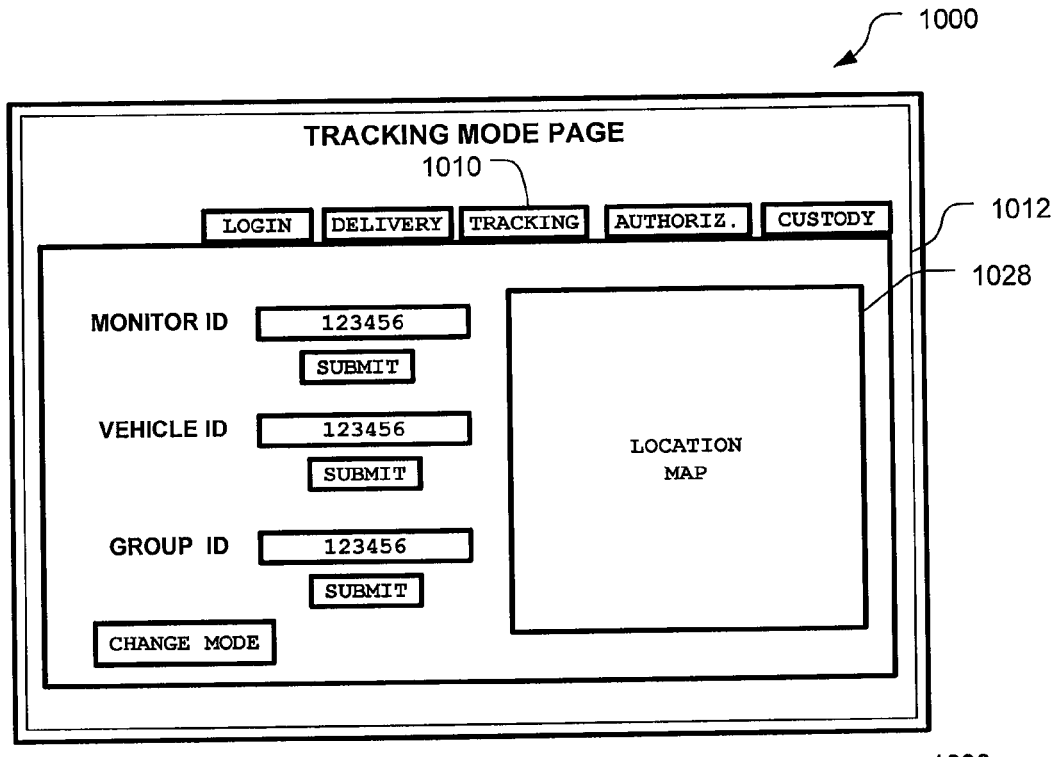

Referring to FIG. 10C, the display 1000 is shown with a tracking mode screen 1012. The tracking mode screen 1012 could be a default display window that is displayed when the end user logs in if the tracking mode is active. Alternatively, the tracking mode screen 1012 could be selected with a tracking mode tab 1010. The tracking mode screen 1010 can display the location map 1028 showing the latest location of vehicles associated with the end user (e.g., those vehicles that the end user is authorized to monitor). The location map 1028 could display the time and date that the location information was obtained from the monitoring system(s). Other parts of the tracking mode screen function similarly to those portions in the delivery mode screen 1008.

Figure 10D:
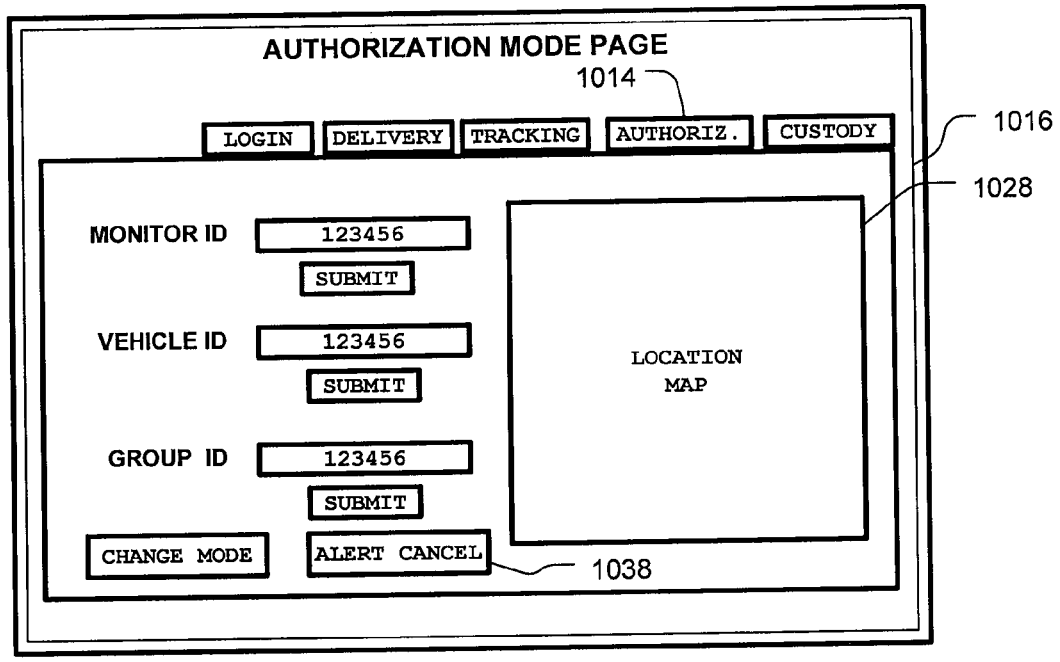

Referring to FIG. 10D, the display 1000 is shown with an authorization mode screen 1016. The authorization mode screen 1016 could be a default display window that is displayed when the end user logs in if the authorization mode is active. Alternatively, the authorization mode screen 1016 could be selected with an authorization mode tab 1012. The authorization mode screen 1016 can display the location map 1028 showing the latest location of vehicles associated with the end user (e.g., those vehicles that the end user is authorized to monitor). The location map 1028 could display the time and date that the location information was obtained from the monitoring system(s). An alert cancel button 1038 can be selected by the end user to cancel a current alert that was triggered by the monitoring system 105 in order to cancel a false alert situation. Other parts of the tracking mode screen function similarly to those portions in the other screens 1008 and 1012.

Figure 10E:
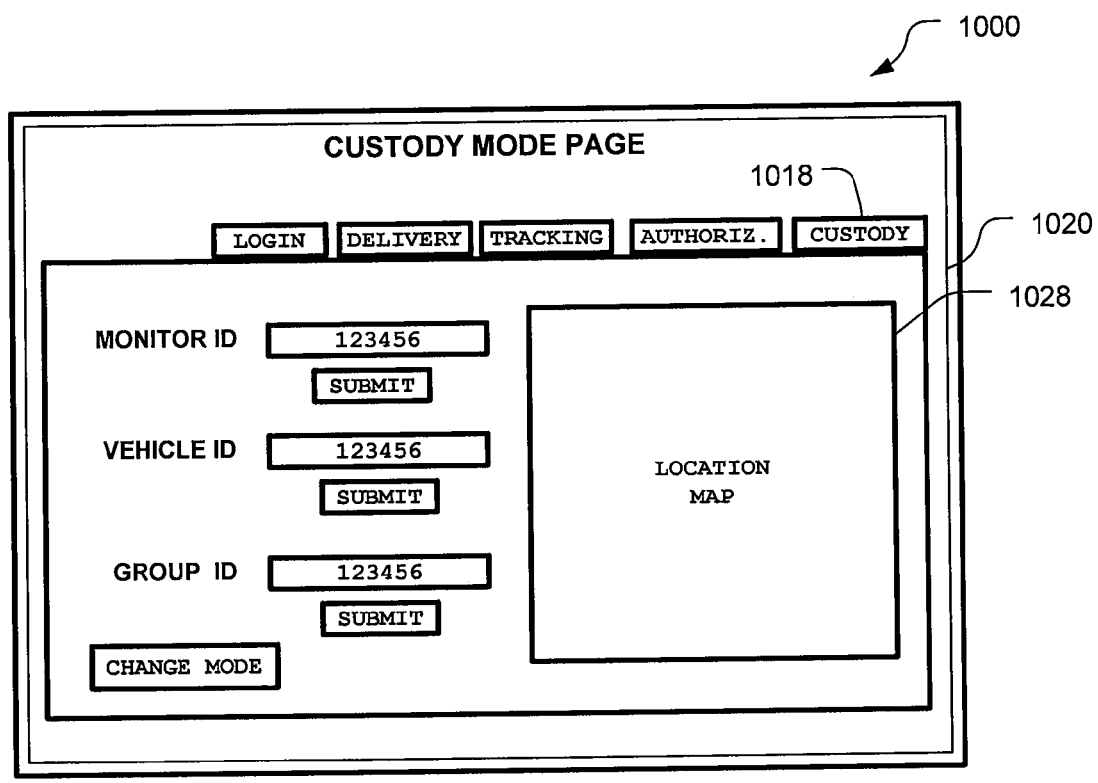

Referring to FIG. 10E, the display 1000 is shown with a custody mode screen 1020. The custody mode screen 1020 could be a default display window that is displayed when the end user logs in if the custody mode is active. Alternatively, the custody mode screen 1020 could be selected with a custody mode tab 1018. The custody mode screen 1020 can display the location map 1028 showing the latest location of vehicles associated with the end user (e.g., those vehicles that the end user is authorized to monitor). The location map 1028 could display the time and date that the location information was obtained from the monitoring system(s). Other parts of the tracking mode screen function similarly to those portions in the other screens 1008, 1012 and 1016.

It should be noted that access to the communication center 130 by the client system 140 or by other authorized entities (such as a car dealership or rental car agency or other custodian) can be conditioned on payment of access fees to the entity providing the communication center and interface (i.e., Web site). Thus, the functionality described herein and the Web interface illustrated in FIGS. 10A-10E can be provided only for those persons who have paid a subscription to the services or purchased a monitor system 105. That is, authorization to the information produced by the communication center 130 may be limited subscribers or purchasers and may be denied to all others. In this way, income for maintaining the communication center is assured.

In some embodiments, the portable key device 120 is programmable by a car dealer or by a monitoring system dealer or installer. It should be programmable so that the dealer can maintain an inventory of "blank" portable key devices 120. These blank portable key devices 120 can then be activated to operate in the authorization mode with the specific monitoring system 105 that is mounted in a vehicle at the time of sale. It would alternatively be possible to maintain previously matched key fob and detector systems. In some embodiments, a dealer will have one or more master key fobs to use with the systems before the associated vehicles are delivered to owners or purchasers.

In some embodiments, the monitoring system 105 is prohibited from performing multiple operating modes simultaneously. In other embodiments, some operating modes can be performed simultaneously, while other operating modes are prohibited from being performed simultaneously. The selection will depend on system resources and usage preferences for the system.

In some embodiments, a custodian has different levels of access to information about the monitoring system 105 and/or different levels of capability to control the monitoring system 105, depending on the current operating mode of the monitoring system 105. For example, prior to the authorization mode of the monitoring system 105 being activated, the custodian may have full access to the information about the location of the monitoring system 105 and full capability to reconfigure the operating modes and parameters of the monitoring system 105. Subsequent to activation of the authorization mode (e.g., upon sale of the vehicle), the custodian may have no or limited access to obtain the location of the vehicle or the change the operating mode of the monitoring system 105. In one embodiment, the custodian may be given more access to location information only if the vehicle is located near the location of the custodian's place of business.

In some embodiments, the custody mode is not cancellable. For example, a rental car company may want to have the ability to always know the location of the vehicles that have been rented. If desired, the control over the custody mode being cancellable or not cancellable can be set from the communication center 130 and/or set in response to a command from the client system 140.

In some embodiments, the authorized users associated with the monitoring system 105 can query for the location of the associated vehicle using email, voice or text communication with the communication center. Such queries may require that the authorized user be questioned to supply answers to predetermined questions that only authorized persons should know (e.g., mother's maiden name, place of birth, etc.).

In some embodiments, the communication center 130 maintains records of past unauthorized movement alerts, both real and false alerts, for people authorized to drive the vehicle (e.g., possessors of the portable key device 120). The communication center can use the past alert information to predict the likelihood that a new alert is real or false. The prediction is based on, for example, using statistical analysis of past real and false alerts for the individual. This information can be communicated to law enforcement agencies in order to provide an indication to the authorities whether the new alert is likely to be real or a false alarm. If the statistical information indicates a strong likelihood that the new alert is real, then the authorities can choose to track the vehicle without confirmation from the owner that the vehicle is missing. If the statistical information indicates a strong likelihood that the new alert is false, then the authorities can choose not to track the vehicle without confirmation from the owner that the vehicle is missing. Other techniques of statistical analysis can be used on the data collected by the communication center 130. For example, the communication center can maintain a database of activity for all vehicles that have the system 105. The collective data can be used for statistical analysis to help determine likelihood of a real theft event or a false alarm. For another example, the data collected will indicate if the portable key device 120 is kept in the vehicle at all times and never removed (such as by detecting the presence of the signal from the portable key device even when the vehicle is not operated and moving). Such a usage pattern may be incorporated into statistical analysis performed on the collected data to determine likelihood that an unauthorized use is really a theft event, or a false alarm.

In some embodiments, the communication center 130 can use data indicative of traffic patterns to predict a likely course for a vehicle being tracked. For example, if a vehicle is approaching a congested portion of a highway and there are limited exits in the vicinity of the congestion, then the communication center 130 could determine, using traffic analysis applications, that the vehicle is likely to exit the highway at the exits in the vicinity of the congestion. This predictive information can be provided to the authorities who are tracking the vehicle and to the client system 140.

While the present invention has been described in detail with reference to the preferred embodiments thereof, it should be understood to those skilled in the art that various changes, substitutions and alterations can be made hereto without departing from the scope of the invention as defined by the appended claims.

We claim:

1. A vehicle monitoring system comprising:
   a communication subsystem configured to provide two-way wireless communication; and
   a controller mounted in a vehicle and configured to receive data indicative of a location of the vehicle and to control the communication subsystem to transmit the data indicative of the vehicle location toward a communication center and receive operational information transmitted from the communication center and to indicate one of a plurality of operating modes in which the system will operate;
   wherein the controller receives a mode change command that specifies one of the operating modes for operation and that is included in the operational information, and in response changes operating mode between an authorization mode in which the controller transmits an alert signal to the communication center, the alert signal comprising the data indicative of the vehicle location and data indicating that the vehicle location change is unauthorized, in response to determining that vehicle location has changed without detecting an authorization signal within a predetermined time interval after determining that the vehicle location has changed, and a tracking mode, in which the controller transmits the data indicative of vehicle location continuously at predetermined intervals regardless of the authorization signal.

2. The system as in claim 1, wherein the authorization signal is received from a portable key device.

3. The system as in claim 2, wherein the authorization signal comprises identification data that is wirelessly read from the portable key device.

4. The system as in claim 2, wherein the portable key device comprises an RFID device.

5. The system as in claim 1, wherein the controller continues to transmit the alert signal in the authorization mode with updated data indicative of vehicle location at predetermined intervals after sending the alert signal.

6. The system as in claim 5, wherein the controller receives an alert cancel signal from the communication center and in response halts sending the alert signal.

7. The system as in claim 1, wherein the mode change command is transmitted from the communication center in response to a request from an authorized person associated with the vehicle monitoring system.

8. The system as in claim 1, wherein the controller responds to the mode change command by changing operating mode to a custody mode in which vehicle identification information is associated with controller identification information and the data indicative of vehicle location is provided to a custodian by the communication center regardless of the authorization signal.

9. The system as in claim 8, wherein the controller transmits the data indicative of vehicle location to the communication center at a predetermined interval for delivery to the custodian.

10. The system as in claim 8, wherein the controller transmits an alert signal to the communication center in response to determining that vehicle location has changed to a location beyond a predetermined location.

11. The system as in claim 1, wherein the controller operates in a delivery mode, prior to receiving the mode change command, in which the controller transmits the data indicative of vehicle location continuously at predetermined intervals in response to determining that vehicle location has changed to a location beyond a predetermined location.

12. The system as in claim 11, wherein the controller transmits the data indicative of vehicle location to the communication center at a predetermined interval for delivery to a custodian.

13. The system as in claim 11, wherein the controller transmits an alert signal to the communication center in response to determining that vehicle location has changed to a location beyond the predetermined location.

14. The system as in claim 11, wherein the controller changes operating mode from the delivery mode to the authorization mode upon receipt of an initialization signal.

15. The system as in claim 14, wherein the initialization signal is received from a portable key device.

16. The system as in claim 14, wherein, in response to receipt of the initialization signal, the controller stores information indicative of the authorization signal.

17. The system as in claim 1, wherein the controller determines that the vehicle has arrived at a location associated with a certified custodian and transmits information identifying an identity of the certified custodian and/or the location associated with the certified custodian to the communication center.

18. A method of monitoring a vehicle, the method comprising:
   receiving data indicative of a location of a vehicle having a monitoring system mounted in the vehicle;
   transmitting the data indicative of the vehicle location from the monitoring system toward a communication center;
   receiving operational information at the monitoring system transmitted from the communication center, the operational information including a mode change command that specifies one of a plurality of operating modes for operation of the monitoring system; and in response to receiving the mode change command, changing operating mode of the monitoring system between an authorization mode and a tracking mode, the authorization mode comprising:
  determining that vehicle location has changed, and transmitting an alert signal from the monitoring system to the communication center, the alert signal comprising the data indicative of the vehicle location and data indicating that the vehicle location change is unauthorized, in response to not detecting an authorization signal within a predetermined time interval after determining that the vehicle location has changed;
  wherein the tracking mode comprises transmitting the data indicative of vehicle location continuously at predetermined intervals regardless of the authorization signal.

19. The method as in claim 18, further comprising receiving the authorization signal from a portable key device.

20. The method as in claim 19, wherein receiving the authorization signal comprises wirelessly reading identification data from the portable key device.

21. The method as in claim 19, wherein the portable key device comprises an RFID device.

22. The method as in claim 18, further comprising:
  in response to receiving the mode change command, changing operating mode to a custody mode in which vehicle identification information is associated with monitoring system identification information; and
  transmitting the data indicative of vehicle location to the communication center regardless of the authorization signal, wherein the communication center provides the data indicative of vehicle location to a custodian.

23. The method as in claim 18, wherein, prior to receiving the mode change command, operating in a delivery mode, the delivery mode comprising:
  transmitting the data indicative of vehicle location continuously at predetermined intervals in response to determining that vehicle location has changed to a location beyond a predetermined location.

24. The method as in claim 18, further comprising:
  determining that the vehicle has arrived at a location associated with a certified custodian; and
  transmitting information identifying an identity of the certified custodian and/or the location of the certified custodian to the communication center.

25. A system for operating a vehicle monitoring system, the system comprising:
  a communication subsystem configured to communicate wirelessly with a vehicle monitoring system that operates in a plurality of operating modes;
  a processor coupled to the communication subsystem and a network, the processor configured to receive a mode request message from an end user via the network, the mode request message comprising a request to change the vehicle monitoring system operating mode between an authorization mode and a tracking mode, control the communication subsystem to receive data indicative of a location of a vehicle from a the vehicle monitoring system mounted in the vehicle, wherein the data indicative of vehicle location is received continuously at predetermined intervals while the vehicle monitoring system is operating in the tracking mode, upon receiving the mode change request, control the communication subsystem to transmit a mode change command to the vehicle monitoring system and, subsequent to transmitting the mode change command, control the communication subsystem to receive an alert signal from the vehicle monitoring system, the alert signal comprising the data indicative of the vehicle location and data indicating that the vehicle has changed location and the location change is unauthorized.

26. The system as in claim 25, wherein the processor is configured to communicate data representing user interface screens to a computer system of the end user via the network.

27. The system as in claim 26, wherein the processor controls the communication subsystem to transmit an alert cancel message to the vehicle monitoring system, wherein the vehicle monitoring system halts transmission of the updated location data in response to the alert cancel message.

28. The system as in claim 25, wherein the processor controls the communication subsystem to receive updated data indicative of an updated location of the vehicle at predetermined intervals subsequent to receiving the alert signal.

29. The system as in claim 25, wherein the processor transmits the data indicative of the vehicle location to the end user via the network.

30. The system as in claim 25, wherein the mode request message comprises a request to change the operating mode of the vehicle monitoring system to a custody mode in which vehicle identification information is associated with monitoring system identification information of the monitoring system, and with receiving the data indicative of vehicle location at the communication center regardless of the authorization signal, wherein the communication center provides the data indicative of vehicle location to a custodian.

31. The system as in claim 25, wherein the processor controls the communication subsystem to receive information identifying an identity of a certified custodian and/or a location of the certified custodian from the vehicle monitoring system, wherein the monitoring system transmitted the information identifying the identity of the certified custodian and/or the location of the certified custodian upon arriving at the location of the certified custodian, and the processor transmits data indicative of pertinent information regarding an owner of the vehicle and/or the vehicle to the certified custodian.

32. A system for operating a vehicle monitoring system, the system comprising:
  a communication subsystem configured to communicate with a communication center via a network;
  a processor coupled to the communication subsystem and the network, the processor configured to control the communication subsystem to communicate a mode request message to the communication center via the network, the mode request message comprising a request to change a vehicle monitoring system that operates in a plurality of operating modes between an authorization mode and a tracking mode, control the communication subsystem to receive data indicative of a location of a vehicle containing the vehicle monitoring system from the communication center, wherein the data indicative of vehicle location is received continuously at predetermined intervals while the vehicle monitoring system is operating in the tracking mode, and, subsequent to transmitting the mode request message, control the communication subsystem to receive an alert signal from the communication center, the alert signal comprising the data indicative of the vehicle location and data indicating that the vehicle has changed location and the location change is unauthorized.

33. The system as in claim 32, wherein the processor controls the communication subsystem to receive updated data indicative of the vehicle location at predetermined intervals from the communication center after receiving the alert signal.

34. The system as in claim 33, wherein the processor controls the communication subsystem to transmit an alert cancel signal to the communication center to request that the vehicle monitoring system halt transmitting the updated location data.

35. The system as in claim 32 wherein the mode request message comprises a request to change the vehicle monitoring system to a custody mode in which vehicle identification information is associated with the monitoring system and the processor controls the communication subsystem to receive the data indicative of vehicle location regardless of whether the location change is unauthorized.

36. A vehicle monitoring system comprising:
- a communication subsystem configured to provide two-way wireless communication; and
- a controller mounted in a vehicle and configured to receive data indicative of a location of the vehicle and to control the communication subsystem to transmit the data indicative of the vehicle location toward a communication center and receive operational information transmitted from the communication center;
- wherein the controller monitors for an authorization signal and responds to a mode change command such that, either the controller controls the communication subsystem to transmit an alert signal to the remote communication center in response to determining that vehicle location has changed without detecting the authorization signal after determining that the vehicle location has changed, or the controller controls the communication subsystem to transmit location data regardless of detecting the authorization signal.

37. The system as in claim 36, wherein the mode change command is received from a portable device.

38. The system as in claim 37, wherein the mode change command received from the portable device is an initialization signal and, in response to receipt of the initialization signal, the controller stores information indicative of the authorization signal.

39. The system as in claim 38, wherein, in further response to receipt of the initialization signal, the controller controls the communication subsystem to transmit data identifying at least one of the vehicle or the monitoring system to the remote communication center.

40. The system as in claim 36, wherein the mode change command is received from the communication center.

41. The system as in claim 36, wherein the controller operates in a delivery mode, prior to receiving the mode change command, in which the controller transmits the data indicative of vehicle location continuously at predetermined intervals in response to determining that vehicle location has changed to a location beyond a predetermined location.

42. The system as in claim 41, wherein the controller stops transmitting the data indicative of vehicle location at predetermined intervals in response to determining that vehicle location has returned to within the predetermined location.

43. The system as in claim 41, wherein, when operating in the delivery mode, the controller receives the mode change command from the communication center, receives data indicative of the authorization signal from the communication center and stores the data indicative of the authorization signal.

44. The system as in claim 41, wherein, when operating in the delivery mode, the controller receives an initialization signal from a portable device, receives data indicative of the authorization signal from the portable device and stores the data indicative of the authorization signal.

45. The system as in claim 36, wherein the controller determines that the vehicle has arrived at a location associated with a certified custodian and transmits information identifying an identity of the certified custodian and/or the location associated with the certified custodian to the communication center.

* * * * *

UNITED STATES PATENT AND TRADEMARK OFFICE
CERTIFICATE OF CORRECTION

Page 1 of 1

PATENT NO.        : 8,115,656 B2
APPLICATION NO.   : 12/392942
DATED             : February 14, 2012
INVENTOR(S)       : Kurt Bevacqua et al.

It is certified that error appears in the above-identified patent and that said Letters Patent is hereby corrected as shown below:

In column 25, claim 25, line 57 please delete "from a the" and insert --from the--

Signed and Sealed this
Twenty-fourth Day of April, 2012

David J. Kappos
*Director of the United States Patent and Trademark Office*